United States Patent
Vankamamidi et al.

(10) Patent No.: US 12,008,241 B2
(45) Date of Patent: Jun. 11, 2024

(54) TECHNIQUES FOR COLLECTING AND UTILIZING ACTIVITY METRICS

(71) Applicant: Dell Products L.P., Hopkinton, MA (US)

(72) Inventors: Vamsi K. Vankamamidi, Hopkinton, MA (US); Ajay Karri, South Grafton, MA (US)

(73) Assignee: Dell Products L.P., Hopkinton, MA (US)

( * ) Notice: Subject to any disclaimer, the term of this patent is extended or adjusted under 35 U.S.C. 154(b) by 55 days.

(21) Appl. No.: 17/959,244

(22) Filed: Oct. 3, 2022

(65) Prior Publication Data

US 2024/0111429 A1    Apr. 4, 2024

(51) Int. Cl.
    *G06F 3/06*    (2006.01)

(52) U.S. Cl.
    CPC ............ *G06F 3/0614* (2013.01); *G06F 3/064* (2013.01); *G06F 3/0667* (2013.01); *G06F 3/0685* (2013.01)

(58) Field of Classification Search
None
See application file for complete search history.

(56) References Cited

U.S. PATENT DOCUMENTS

2023/0036528 A1*    2/2023    Vankamamidi ......... G06F 3/067

OTHER PUBLICATIONS

U.S. Appl. No. 17/971,939, filed Oct. 24, 2022, entitled Techniques for Determining and Using Temperature Classifications With Adjustable Classification Boundaries, to Vamsi K. Vankamamidi, et al.

\* cited by examiner

*Primary Examiner* — Kevin Verbrugge

(74) *Attorney, Agent, or Firm* — Muirhead and Saturnelli, LLC

(57) ABSTRACT

In a multi-tiered system, read temperature and write temperature per virtual block (VLB) can be determined based on the content referenced by each VLB. The read temperature can describe VLB read activity relative to the recency and frequency of read misses of content referenced by the VLB. The write temperature can describe VLB write activity relative to the recency and frequency of overwrites with respect to content referenced by the VLB. Read misses and overwrites can be recorded per processing core in an active tablet used for recording by only a single core. Active and analytic tablet sets across cores can be switched based on criteria. Analytic tablets can be processed and used to update metrics, including read and write temperatures, stored for VLBs. The metrics can be used to determine temperature classifications of VLBs. Content referenced by VLBs can be promoted and/or demoted using VLB temperature classifications.

20 Claims, 17 Drawing Sheets

| OP | PLBIDX | VLB ADDR | RANGE |
|---|---|---|---|
| RM | 10 | 1001 | 2 |
| RM | 10 | 1000 | 10 |
| DR | 100 | 1001 | 1 |
| RM | 100 | 1002 | 100 |
| ... | ... | ... | ... |
| RM | 2000 | 40002 | 3 |
| DR | 2000 | 40000 | 1 |

1460 — 1462 / 1464 / 1466

| 1452a | 1452b | 1452c | 1452d |
|---|---|---|---|
| OP | PLBIDX | VLB ADDR | RANGE |
| RM | 10 | 1001 | 2 |
| RM | 2000 | 40002 | 3 |
| DR | 100 | 1001 | 1 |
| RM | 10 | 1000 | 10 |
| ... | ... | ... | ... |
| DR | 2000 | 40000 | 1 |
| RM | 100 | 1002 | 100 |

TECHNIQUES FOR COLLECTING AND UTILIZING ACTIVITY METRICS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise:
  recording, by a plurality of processing cores, occurrences of read misses and overwrites in entries of a first plurality of tablets designated as active tablets, wherein each of the plurality of processing cores has an associated pair of tablets including one of the first plurality of tablets and one of a second plurality of tablets designated as analytic tablets, wherein said each processing core records occurrences of read misses and overwrites in said one of the first plurality of tablets of the associated pair designated as an active tablet; determining, in accordance with one or more switching criteria, to switch roles of the first plurality of tablets and the second plurality of tablets; responsive to said determining, switching roles of the first plurality of tablets and the second plurality of tablets, wherein after said switching, the first plurality of tablets is designated as analytic tablets and the second plurality of tablets is designated as active tablets; merging, in accordance with physical block indices uniquely identifying physical blocks of storage, entries of the first plurality of tablets designated as analytic tablets, wherein said merging includes:generating one of a plurality of tables of merged entries for each of the physical block indices wherein said one table includes merged entries of the first plurality of tablets associated with said each physical block index, wherein each of the physical blocks of storage includes content referenced by one or more virtual blocks of a plurality of virtual blocks; updating, in accordance with the plurality of tables, a plurality of metric sets associated with the plurality of virtual blocks; determining, using a first of the plurality of metric sets for a first of the plurality of virtual blocks referencing first content stored on a first of the physical blocks of storage, first one or more temperature classifications of the first virtual block at a current point in time; and determining, in accordance with said first one or more temperature classifications of the first virtual block at the current point in time, placement of the first content referenced by the first virtual block in one of a plurality of storage tiers.

In at least one embodiment, each of the plurality of storage tiers can have a relative performance ranking, and wherein the first content can be currently stored in the first physical block of a first storage tier of the plurality of storage tiers. Determining placement of the first content can include determining, in accordance with a policy, to move the first content from the first storage tier to a second of the plurality of storage tiers. Responsive to determining to move the first content from the first storage tier to the second storage tier, the method can include moving the first content from the first physical block of the first storage tier to a second physical block of the second storage tier. Moving the first content can be a demotion where the first storage tier has a higher relative performance ranking than said second storage tier. Moving can be a promotion where the first storage tier has a lower relative performance ranking than said second storage tier.

In at least one embodiment, the first one or more temperature classifications determined at the current point in time can include a read temperature classification determined in accordance with the current point in time and first information of the first metric set, wherein said first information of the first metric set can include a first read temperature of the first virtual block, and a first timestamp of the first read temperature. The first one or more temperature classifications determined at the current point in time can include a write temperature classification determined in accordance with the current point in time and first information of the first metric set, wherein said first information of the first metric set can include a first write temperature of the first virtual block, and a first timestamp of the first write temperature.

In at least one embodiment, generating said one table for said each physical block index can include combining a first entry of a first table of the first plurality and a second entry of a second table of the first plurality, wherein said first entry and said second entry can each have a same operation and a same virtual block, and wherein said same operation can be one of a read miss or an overwrite. The first entry of the first table can be recorded by a first of the plurality of processing cores. The first entry can indicate that said first processing core performed the same operation with respect to second content stored in a physical block uniquely identified by said each physical block index. The second content can be referenced by the same virtual block, and wherein the second entry of the second table can be recorded by a second of the plurality of processing cores. The second entry can indicate that said second processing core performed the same operation with respect to third content stored in the physical block uniquely identified by said each physical block index. The third content can be referenced by the same virtual block.

In at least one embodiment, each occurrence of a read miss recorded in one of the plurality of first tablets while designated as an active tablet can be recorded in an entry in said one tablet. Each occurrence of a read miss can denote a read cache miss with respect to associated content referenced by one of the plurality of virtual blocks. The entry recorded can include an operation type of read miss, a physical block index of a physical storage block storing the associated content, a virtual block address or identifier corresponding to the one virtual block referencing the associated content, and a count denoting a number of data pages of the physical storage block storing the associated content.

In at least one embodiment, each occurrence of an overwrite recorded in one of the plurality of first tablets while designated as an active tablet can be recorded in an entry in said one tablet. Each occurrence of an overwrite can denote a decrement of a reference count of associated content stored on a physical storage block where the reference count can be included in one of the plurality of virtual blocks referencing the associated content. The entry recorded can include an operation type denoting a reference count decrement, a physical block index of the physical storage block storing the associated content, a virtual block address or identifier corresponding to the one virtual block referencing the associated content, and a count denoting a number of data pages of the physical storage block storing the associated content.

In at least one embodiment, the switching criteria can indicate to switch roles of the first plurality of tablets designated as active tablets and the second plurality of tablets designated as analytic tablets when at least one of the plurality of first plurality of tablets is full where the said one tablet has no free entries for recording additional operations. The switching criteria can indicate to switch roles of the first plurality of tablets designated as active tablets and the second plurality of tablets designated as analytic tablets when at least a threshold number of the first plurality of tablets each have consumed at least a specified amount of entries in said each tablet. The switching criteria can indicate to switch roles of the first plurality of tablets designated as active tablets and the second plurality of tablets designated as analytic tablets when a specified amount of time has elapsed since roles were last switched between the first plurality of tablets and the second plurality of tablets. The switching criteria can indicate not to switch roles of the first plurality of tablets designated as active tablets and the second plurality of tablets designated as analytic tablets if processing of the second plurality of tablets designated as analytic tablets has not yet completed.

In at least one embodiment, a first of the plurality of processing cores can have a higher relative workload in comparison to at least one or more others of the plurality of processing cores. The processing core can record entries in a first of the first plurality of tablets designated as active tablets. The first processing core can record entries in the first tablet at a first sampling rate such that one out of every N read miss or overwrite operations performed by said first processing core is recorded in said first tablet, where N can an integer greater than one.

In at least one embodiment, a job manager can launch a plurality of jobs to perform processing including said merging and said updating. The job manager can vary a number of jobs launched to ensure processing of the first plurality of tablets, when designated as analytic tablets, completes prior to any one or more of the second plurality of tablets, when designated as active tablets, becoming full.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 9 and 11 are examples illustrating tablets that can be used in at least one embodiment in accordance with the techniques of the present disclosure.

DETAILED DESCRIPTION OF EMBODIMENT(S)

Figure 1:
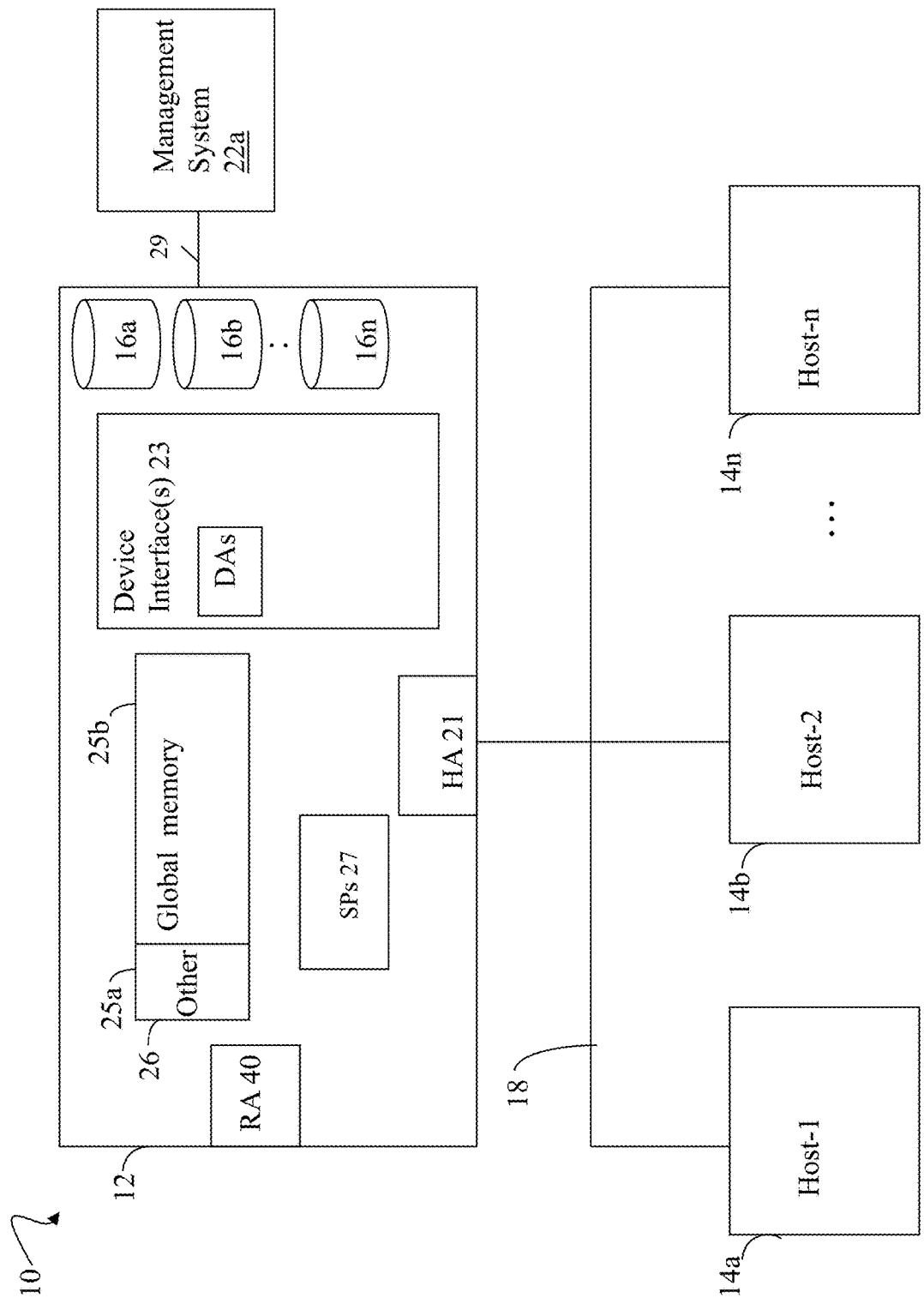
FIG. 1 is an example of components that may be included in a system in accordance with the techniques of the present disclosure.

In some data storage systems, user data or content located at logical addresses can be stored on multiple storage tiers. A multi-tiered system can include multiple tiers of storage devices. Each tier can include non-volatile storage devices of one particular performance classification such that the tiers can be ranked in terms of relative performance. For example, in at least one system, the tiers can include a first tier 1 of non-volatile SSDs, such as a tier of flash-based drives, and a second tier 2 of HDDs (hard disk drives) or rotating disk drives, where tier 1 is a higher performance tier than tier2. Put another way and more generally, drives of tier 2 can be characterized as a relatively slower performance media than drives of tier1.

In some multi-tiered systems as noted above, the amount of SSD capacity of the higher performance tier for storing user data can be generally much smaller than the HDD capacity of the lower performance tier for storing user data. In at least one system, the SSDs can also effectively act like a write through cache. Since the amount of SSD capacity (e.g., capacity of the higher performance tier) can generally be much less than the HDD capacity (e.g., capacity of the lower performance tier), not all user data can be stored in the SSD tier. As a result, one or more criteria can be specified and used to decide what particular portions of user data or content are stored in each of the SSD tier and the HDD tier.

Described in the following paragraphs are techniques that can be used to efficiently track and update one or more metrics of different stored content or data portions, where the metrics characterize the temperature of the corresponding content or data portions. In at least one embodiment, the tracked metrics can be used to determine placement of stored content or data portions. In at least one embodiment, the one or more metrics can be used to determine what content or data portions from the HDD tier to promote to the SSD tier. In at least one embodiment, the one or more metrics can be used to determine what content or data portions from the SSD tier to demote to the HDD tier. The one or more metrics can generally be used to determine a temperature of stored content or an associated data portion and can be used in any suitable application, such as demotion and promotion between tiers noted above, as well as other applications.

In at least one embodiment, the criteria used to decide what particular portions of user data or content are stored in each of the multiple tiers can include the one or more metrics characterizing the activity, temperature, or frequency of access of the stored content or user data portions. In at least one embodiment, the criteria can also specify that the user data with the highest activity level or temperature is stored in the SSD tier and other user data which has a relatively lower activity level or temperature is stored in the HDD tier. Over time, the activity level or temperature of the stored user data can change such that, for example, "hot" data which has a high activity level or temperature (frequently accessed) can become "cold" with a low activity level or temperature. In a similar manner, user data that is cold with a relatively low activity level or temperature can become hot as the frequency of access of the user data increases. In this manner, the activity level or temperature of different data portions can be used to determine what data portions to move or migrate between the HDD and SSD tiers. For example, data stored in the SSD tier which was hot and becomes cold can be demoted from the SSD tier to the HDD tier whereby the data is moved from the SSD tier to the HDD tier. In a similar manner, data stored in the HDD tier which was cold and becomes hot can be promoted from the HDD tier to the SSD tier whereby the data is moved from the HDD tier to the SSD tier.

In at least one embodiment in accordance with the techniques of the present disclosure, the metrics can include read miss and overwrite operations. In at least one embodiment, multiple processing cores can each use a pair of tablets where each pair includes an active tablet and an analytics tablet. A tablet can be an in-memory structure stored in volatile memory. Each tablet can generally include records of recorded information regarding a particular instance of each read miss and each overwrite operation performed. Each core can record information in its active tablet regarding processing performed by the core itself. In at least one embodiment, a core can record in its active tablet a record for each read miss and each overwrite handled by the core. The analytics tablet of a core can represent an inactive tablet of information regarding recorded operations which are analyzed. The set of active tablets and the set of analytics tablets can be continually switched or swapped in response to switching criteria. For example, as one or more active tablets of cores become filled, the switching criteria can specify to switch or swap the sets of active and analytics tablets across the cores. Put another way, prior to the switch or swap, a first set of tablets across the cores can be designated as active tablets and a second set of tablets across the cores can be designated as analytics tablets. After the switch or swap, the first set of tablets can be designated as the analytics tablets and the second set of tablets can be designated as the active tablets. In this manner, the sets of tablets across the cores can be continually switched or swapped to allow for processing of information of the currently designated analytics tablets.

The foregoing and other aspects of the techniques of the present disclosure are described in more detail in the following paragraphs.

Referring to the FIG. 1, shown is an example of an embodiment of a SAN10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data storage entity or structure, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
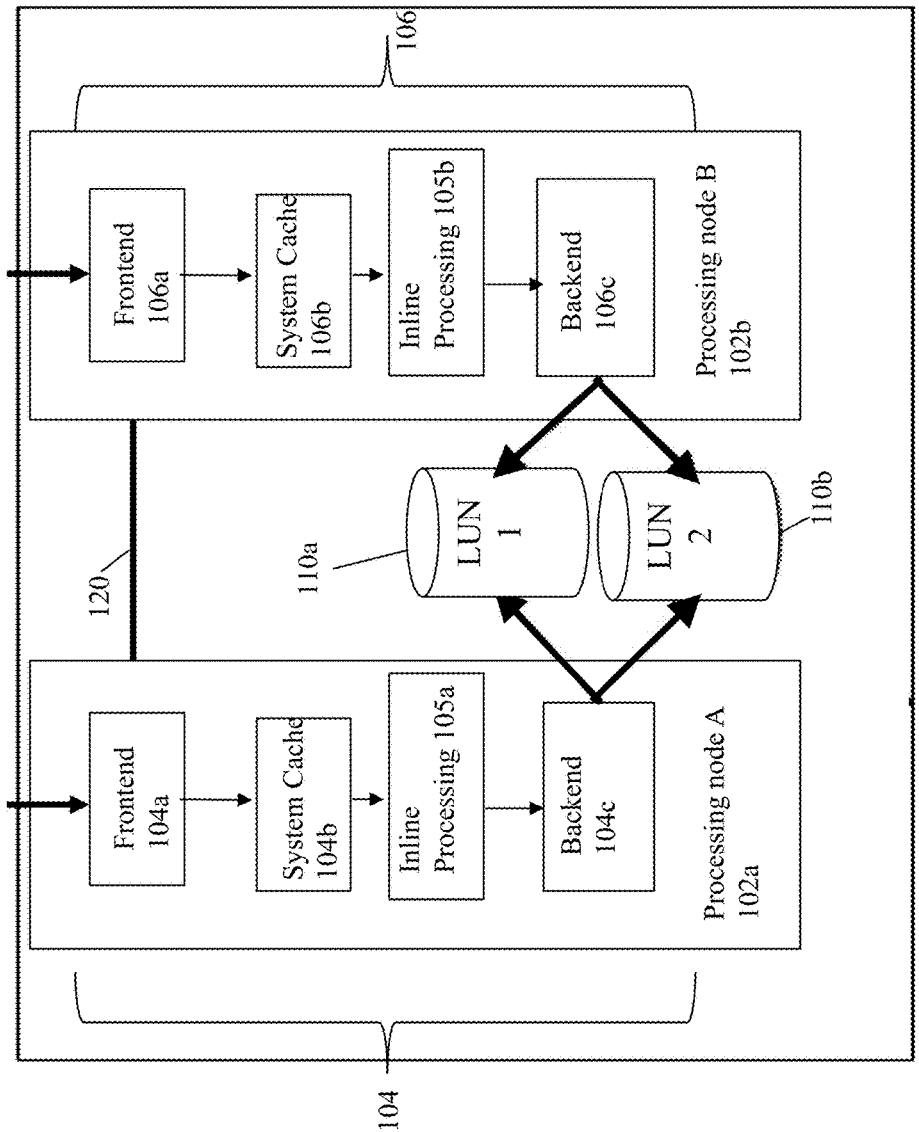
FIG. 2 is an example illustrating the I/O path or data path in connection with processing data in at least one embodiment in accordance with the techniques of the present disclosure.

With reference to the FIG. 2, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the non-volatile cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2, for write operations, latency can be affected by the amount of time taken to store the write data in the log where the write data is visible to both nodes or controllers of the system.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

It should be noted that the flushing of the log can be performed in response to an occurrence of any one or more defined conditions. For example, the log can be flushed in response to determining that the amount of reclaimed log space available for use and allocation is less than a specified threshold amount or size.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 3:
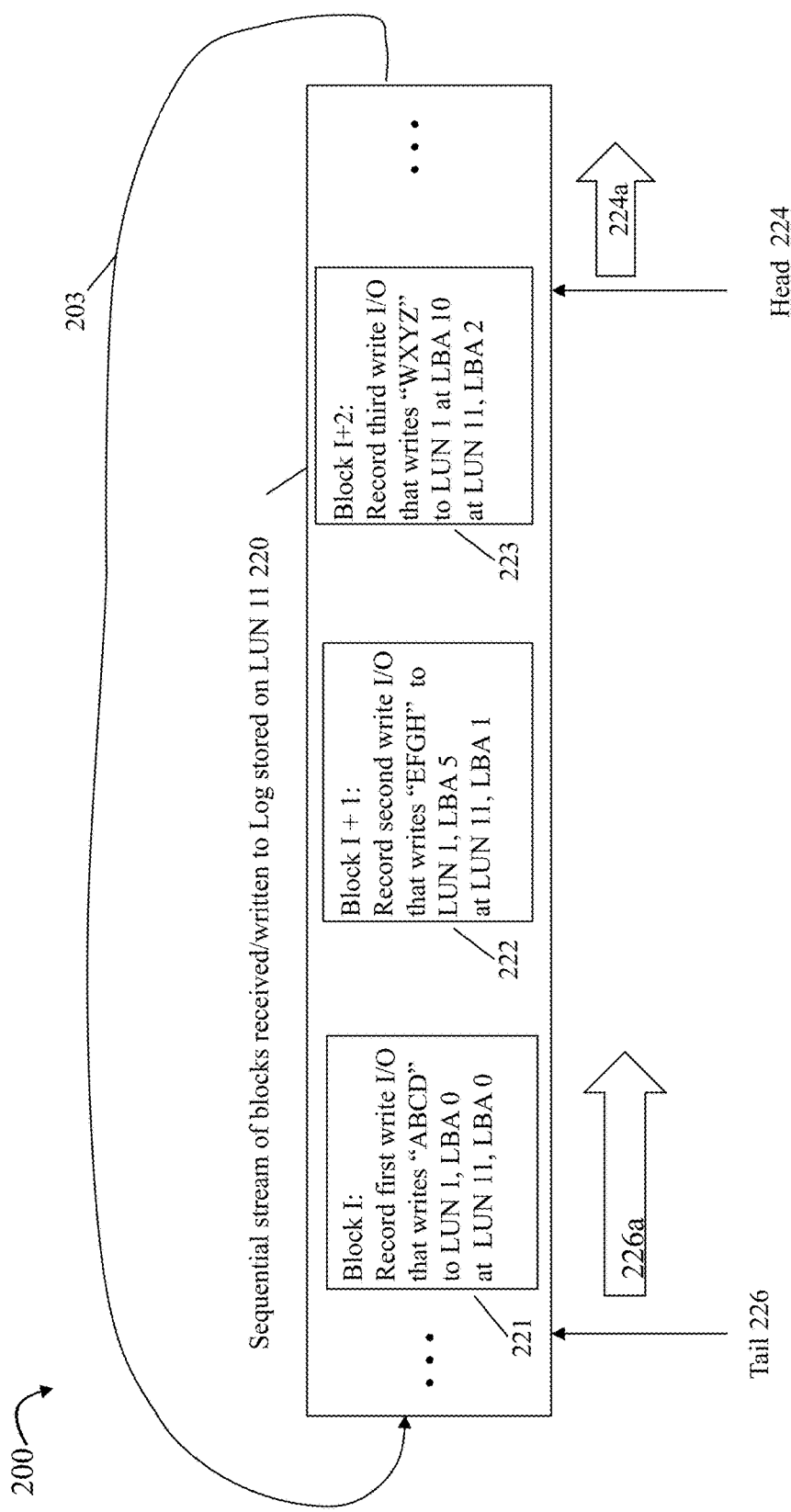
FIGS. 3, 4, 5A and 5B are examples illustrating use of a log in at least one embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
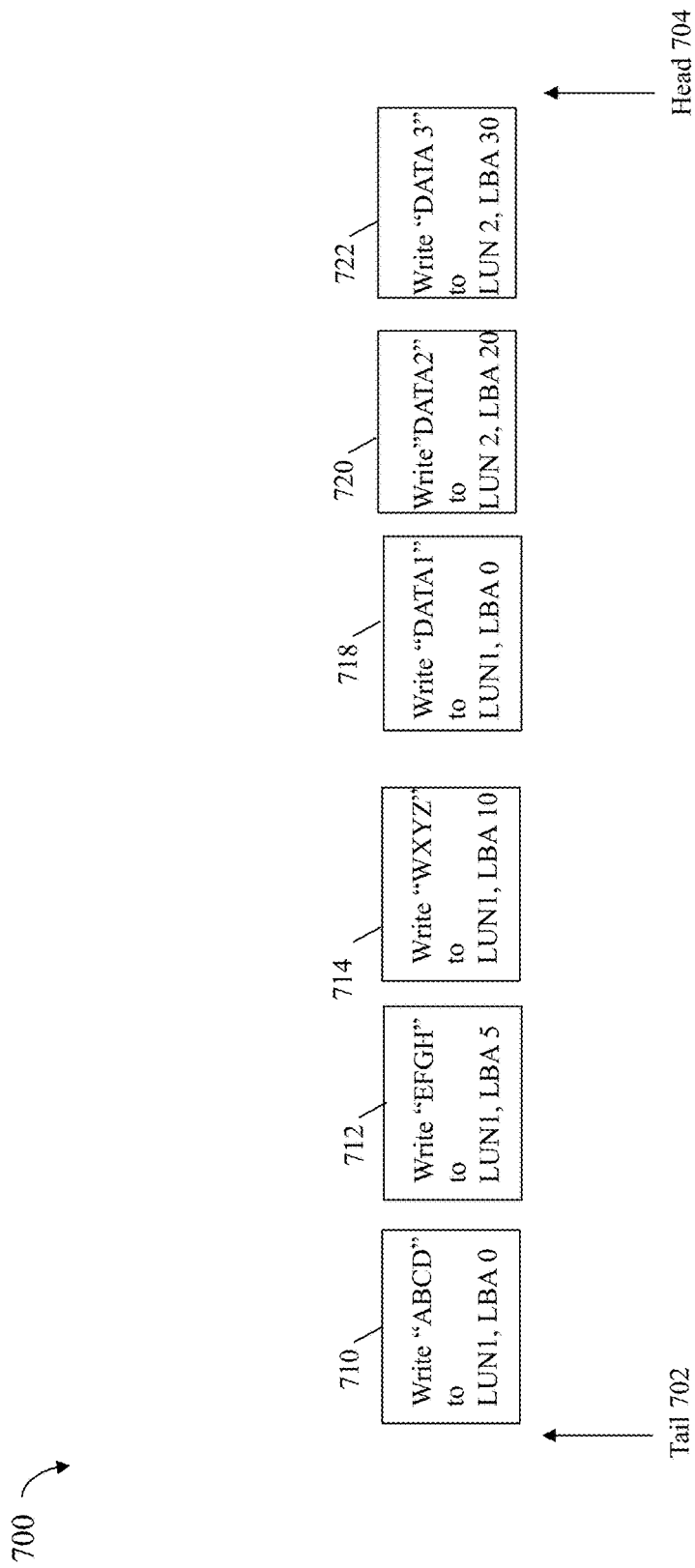

Referring to FIG. 4, shown is an example of information that can be included in a log in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations. It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 5A:
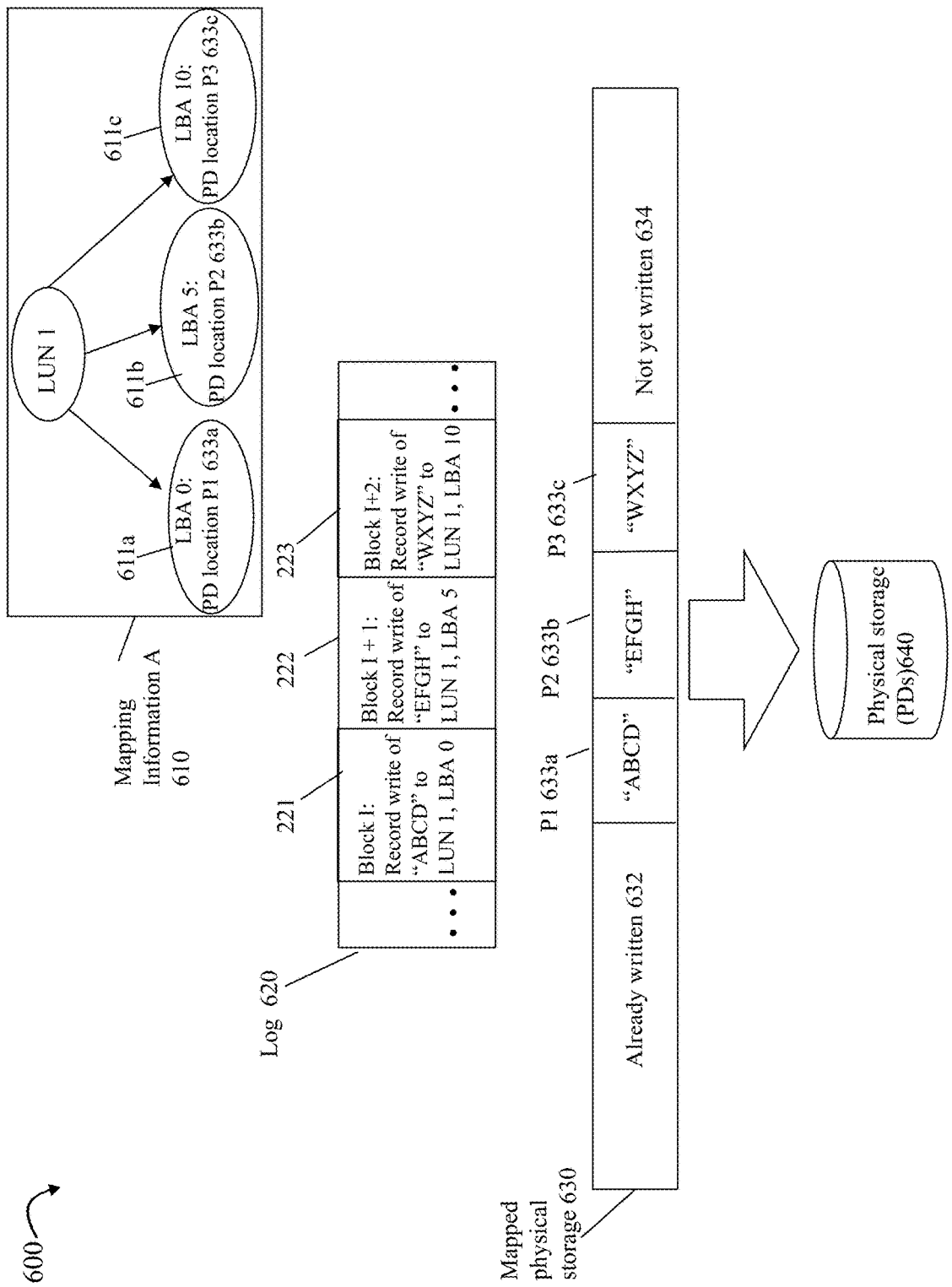

Referring to FIG. 5A, shown is an example 600 illustrating the flushing of logged writes and the physical data layout of user data on BE PDs in at least one embodiment in accordance with the techniques of the present disclosure. FIG. 5A includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, recorded writes in the log are processed as corresponding entries are flushed from the log, where the data written by the writes (as recorded in the log) is stored at new physical storage locations on the BE PDs which is illustrated in further detail below with reference to FIG. 5B. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described in connection with the log of FIGS. 3, 4 and 5A containing the data prior to being flushed to the physical storage 630 of the BE PDs.

Figure 5B:
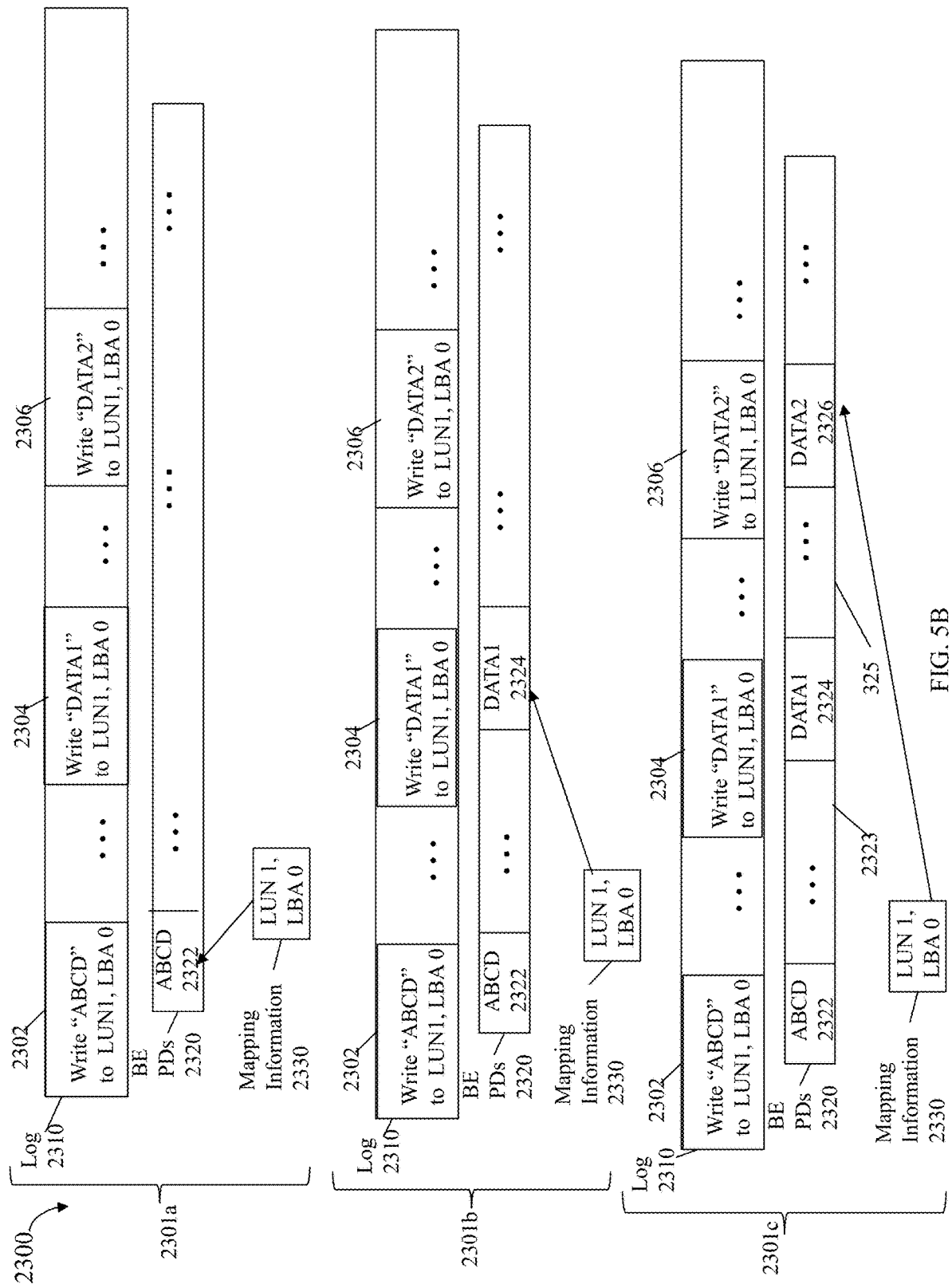

For example with reference to FIG. 5B, the element 2301a can denote the state of the log file 2310, BE PDs 2320 and mapping information 2330 at a first point in time T1 after processing the record 2302 for a first write of "ABCD" to the logical address LUN A, LBA 0. The data written "ABCD" by the recorded write of 2302 can be stored at the BE PD location 2322. Thus, flushing the log record 2302 results in storing the write data "ABCD" to the BE PD location 2322 and additionally updating the mapping information 2330 to reference the BE PD location 2322. The mapping information 2330 denotes the metadata used to map the logical address LUN 1, LBA 0 to the current physical location on the BE PDs containing the user data or content stored at the logical address LUN 1, LBA 0. After the log record 2302 is flushed from the log 2310, the record 2302 is available and can be subsequently reclaimed for reuse for logging other operations in the log 2310.

At a second point in time T2 subsequent to T1, the log record 2304 can be processed and flushed to the BE PDs 2320. The element 2301b denotes the state of the log file 2310, BE PDs 2320 and mapping information 2330 at the second point in time T2 after processing the record 2304 for a second write of "DATA1" to the logical address LUN A, LBA 0. The data written "DATA1" by the recorded write of 2304 can be stored at the BE PD location 2324. Thus, flushing the log record 2304 results in storing the write data "DATA1" to the BE PD location 2324 and additionally updating the mapping information 2330 to reference the BE PD location 2324 denoting the physical location containing the data stored at the LUN 1, LBA 0 at the time T2. Additionally, the PD location 2322 can be invalidated since it no longer contains valid current data for the logical address LUN 1, LBA 0, whereby the PD location 2322 can be available for reuse. After the log record 2304 is flushed from the log 2310, the record 2304 is available and can be subsequently reclaimed for reuse for logging other operations in the log 2310.

At a third point in time T3 subsequent to T2, the log record 2306 can be processed and flushed to the BE PDs 2320. The element 2301c denotes the state of the log file 2310, BE PDs 2320 and mapping information 2330 at the third point in time T3 after processing the record 2306 for a third write of "DATA2" to the logical address LUN A, LBA 0. The data written "DATA2" by the recorded write of 2306 can be stored at the BE PD location 2326. Thus, flushing the log record 2306 results in storing the write data "DATA2" to the BE PD location 2326 and additionally updating the mapping information 2330 to reference the BE PD location 2326 denoting the physical location containing the data stored at the LUN 1, LBA 0 at the time T3. Additionally, the PD location 2324 can be invalidated since it no longer contains valid current data for the logical address LUN 1, LBA 0, whereby the PD location 2324 can be available for reuse. After the log record 2306 is flushed from the log 2310, the record 2306 is available and can be subsequently reclaimed for reuse for logging other operations in the log 2310.

As illustrated by the elements 2301a-c, over time, the physical storage locations 2322, 2324 of the BE PDs 2320 become free and available for reuse. The other physical storage locations 2323, 2325 and 2326 can still contain valid data. Thus, the free, available reusable physical storage locations 2322, 2324 can form holes or segments interspersed among the other portions 2323, 2325, 2326 containing valid data. More generally, the size of the holes 2322, 2324 can be of varying sizes and can include multiple user data blocks or pages. Additionally, portions of physical storage of the BE PDs can also be similarly allocated and then freed for reuse for other purposes. Thus, the holes of free, reusable physical storage as well other portions of physical storage including valid data can result not only from flushing the log file but also from other purposes that can vary with embodiment.

FIG. 5B illustrates the general operation of an LSS where the log is used to record write I/O operations and the written data of each write operation can be stored at a new physical storage location. Additionally, FIG. 5B illustrates overwriting of the same logical address by multiple write I/Os where each such write I/O can write new data to the same logical address. In an LSS, even with overwriting the same logical address, the write data of each write I/O to the logical address can be stored at a new physical storage location rather than overwriting an existing physical storage location including the content of the logical address prior to the write I/O.

In at least one embodiment, a metadata (MD) structure of mapping information can be used in accordance with the techniques herein.

The mapping information (e.g., such as mapping information 610) can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 6A:
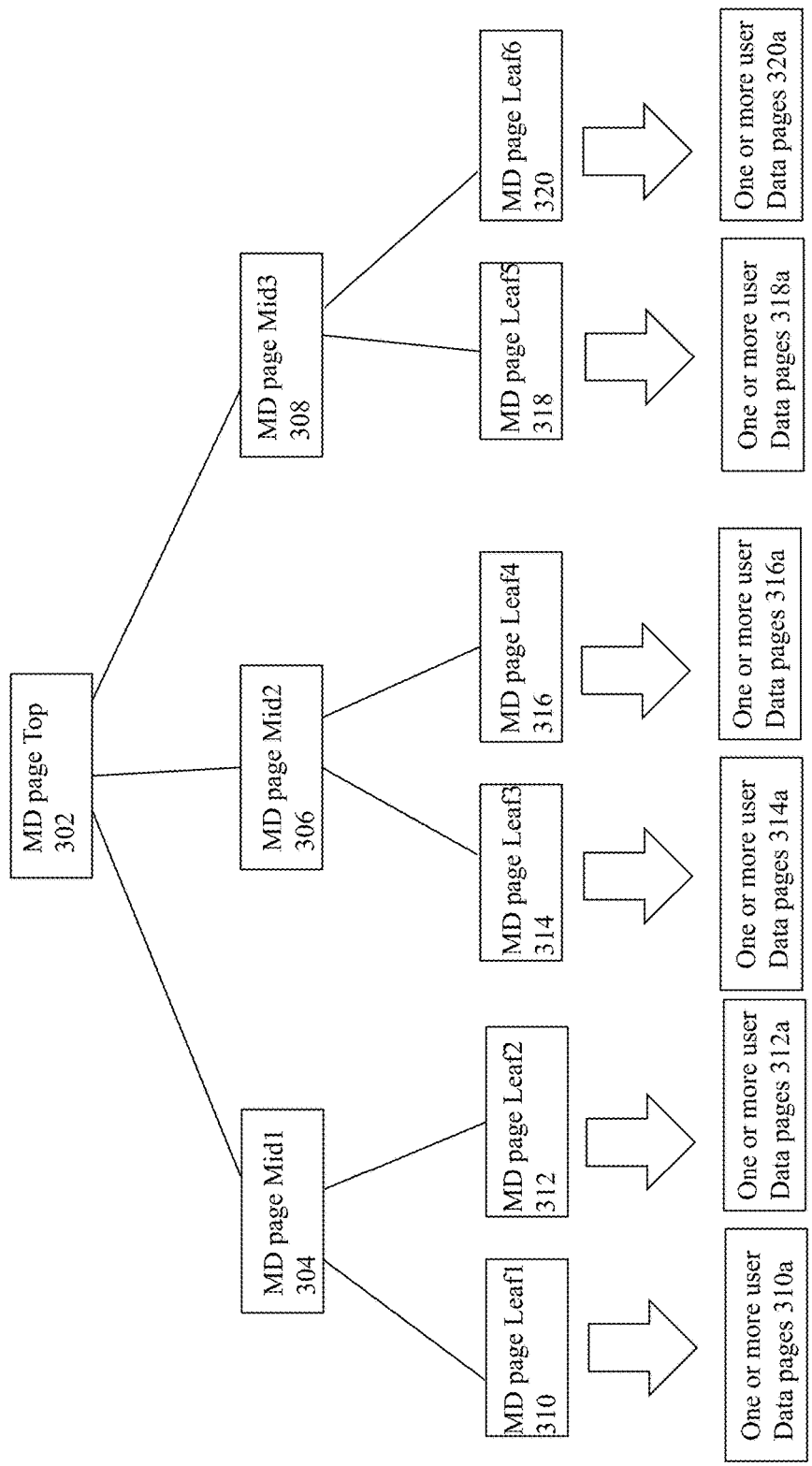
FIGS. 6A, 6B, 6C and 6D are examples of mapping information in the form of a metadata structure that can be used in connection with mapping logical addresses to physical addresses or storage locations in at least one embodiment in accordance with the techniques of the present disclosure.

In at least one embodiment, the mapping structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 6A as including only 3 levels where each node in the tree can have at most 3 child nodes. Generally, the techniques herein can be used with any layered or hierarchical structure of MD pages.

Referring to FIG. 6A, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 6A, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 6B:
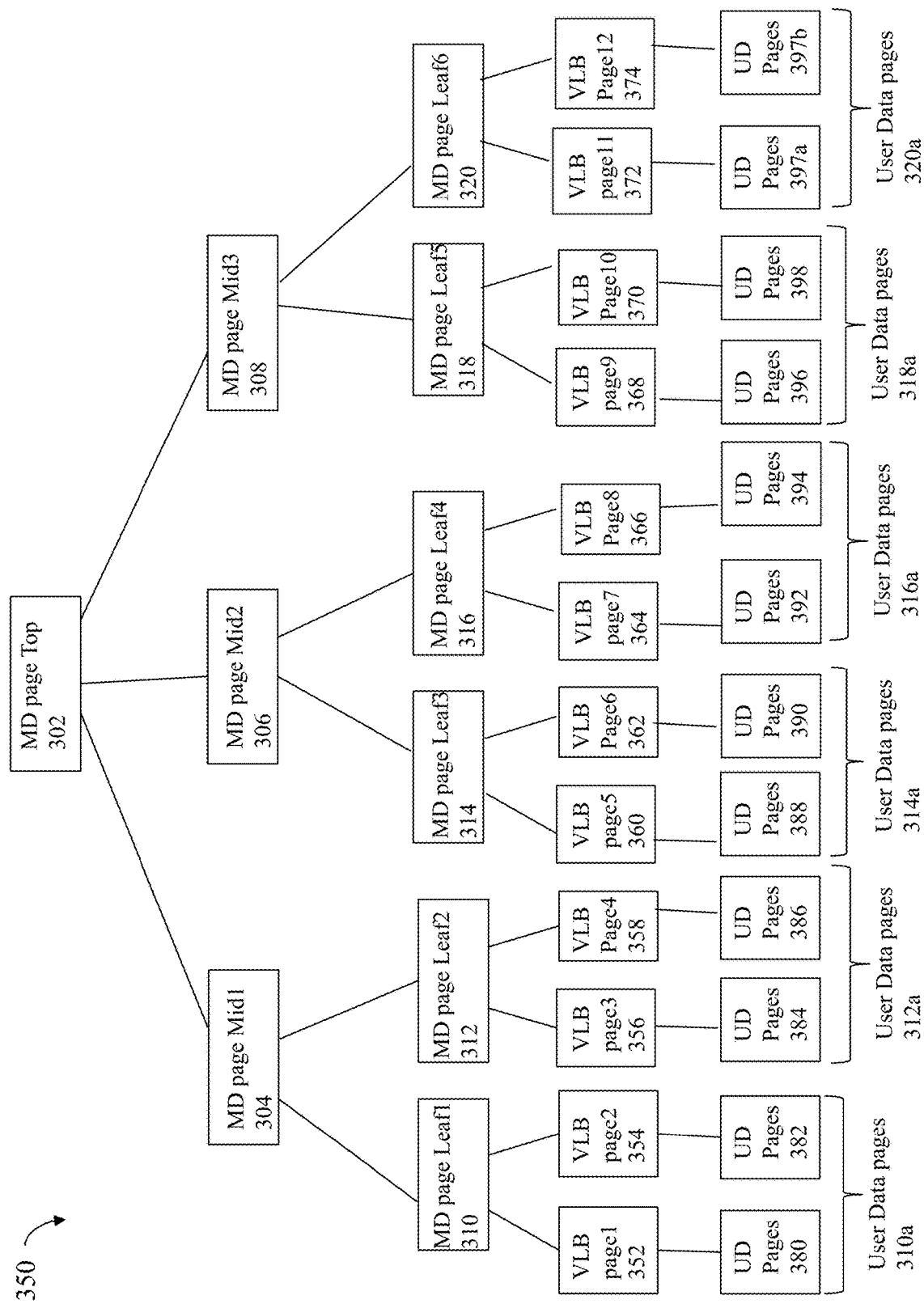

Referring to FIG. 6B, shown is a more detailed version of a hierarchical structure used as the mapping structure 108 that can be used in an embodiment in accordance with the techniques of the present disclosure. The structure 350 is similar to the structure 300 as described and illustrated in FIG. 6A with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 6A. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 6A including data for LBAs 0-511. The UD pages 384 and 386 denote two portions of UD pages corresponding to UD pages 312a of FIG. 6A including data for LBAs 512-1023. The UD pages 388 and 390 denote two portions of UD pages corresponding to UD pages 314a of FIG. 6A including data for LBAs 1024-1535. The UD pages 392 and 394 denote two portions of UD pages corresponding to UD pages 316a of FIG. 6A including data for LBAs 1536-2047. The UD pages 396 and 398 denote two portions of UD pages corresponding to UD pages 318a of FIG. 6A including data for LBAs 2048-2559. The UD pages 397a and 397b denote two portions of UD pages corresponding to UD pages 320a of FIG. 6A including data for LBAs 2560-3072.

In furtherance of the example above regarding UD page X and now with reference to FIG. 6B, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 6C:
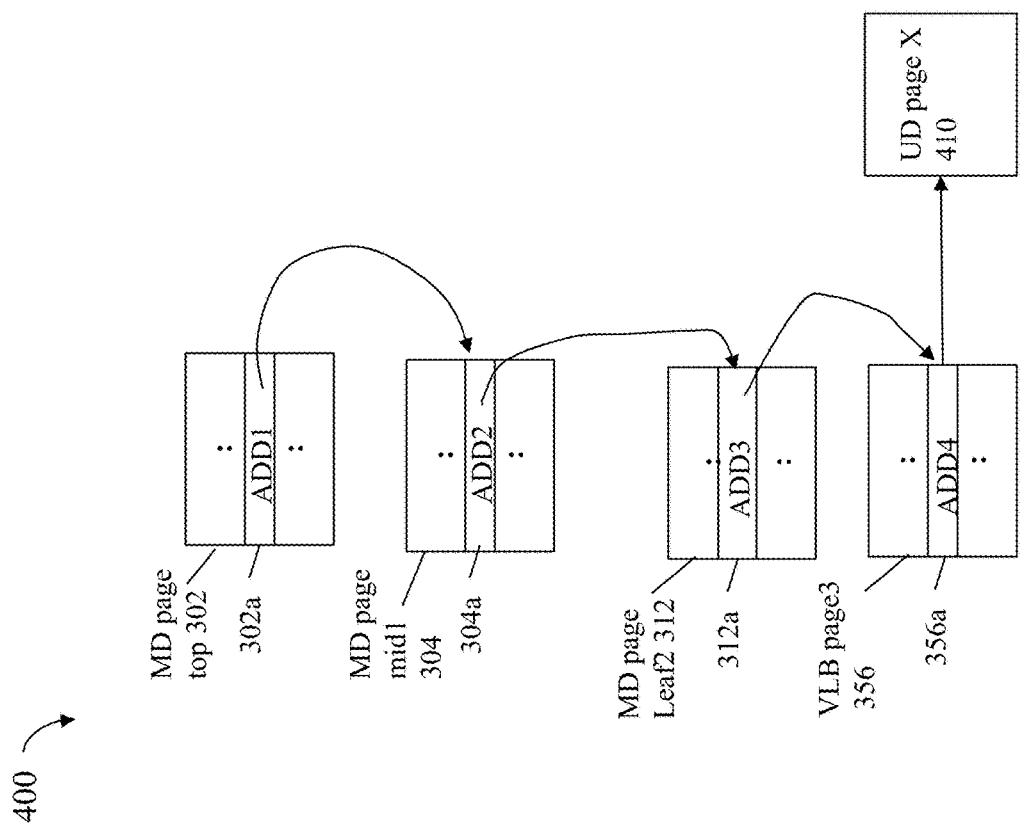

Referring to FIG. 6C, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 6C includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6D:
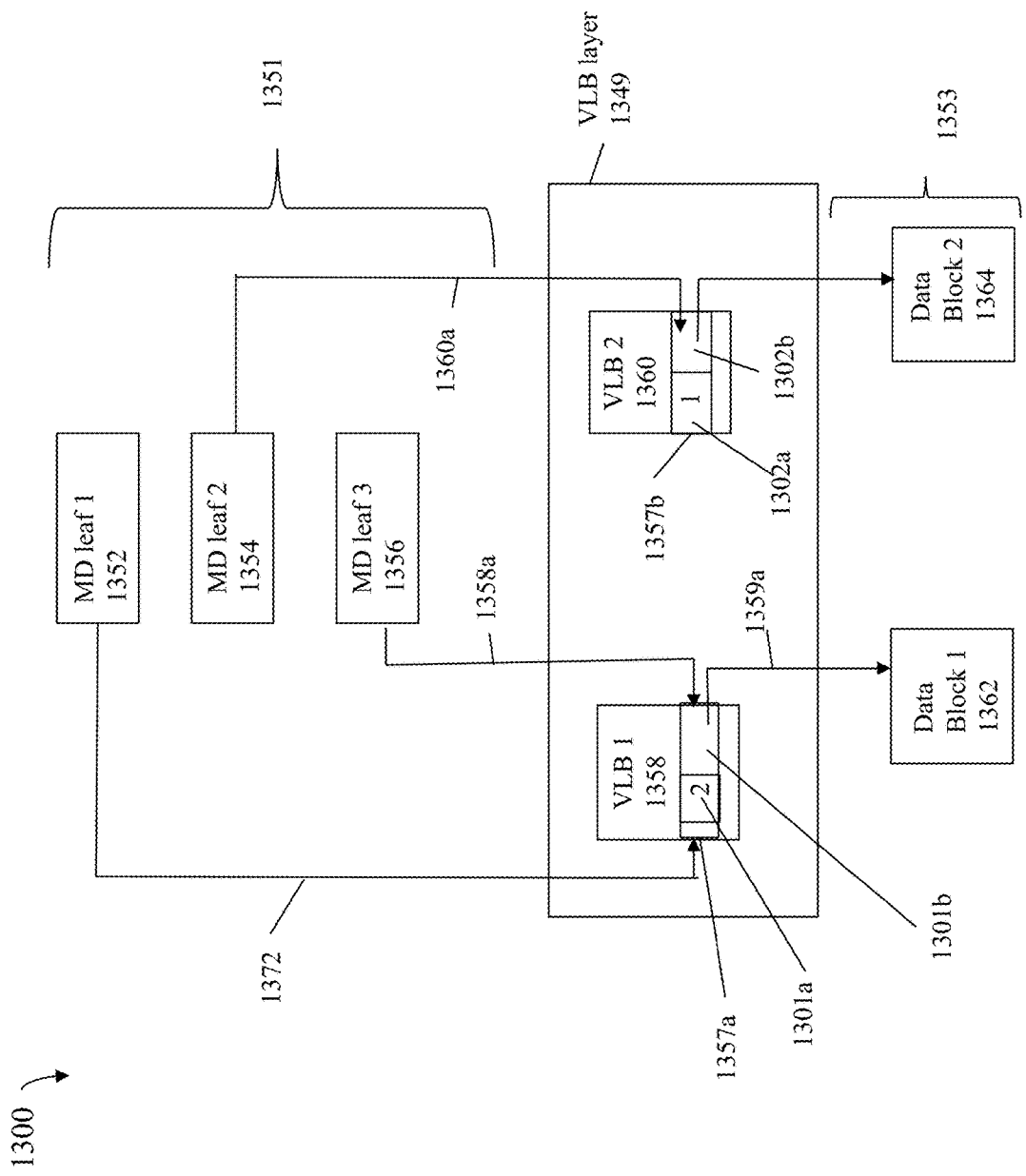

Referring to FIG. 6D, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 6A-C). The elements 1358 and 1360 denote 2 VLBs included in the intervening VLB layer 1349 between MD leaf nodes 1351 and data blocks 1353. The elements 1362 and 1364 denote 2 data blocks each storing unique content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In particular, a first logical address LA1 can have first mapping information which includes a first MD leaf entry of MD leaf 1352 pointing 1372 to the VLB entry 1357a indicating that first content of block 1362 is stored at LA1. Additionally, a second logical address LA2 can have second mapping information which includes a second MD leaf entry of MD leaf 1356 pointing 1358a to the VLB entry 1357a indicating that the first content of block 1362 is also stored at LA2.

In the example 1300, MD leaf node 1354 points to the entry 1357b of the VLB 1360 whereby the entry 1357b of the VLB2 1360 then further references or points to the data block 1364. A third logical address LA3 can have third mapping information which includes a third MD leaf entry of MD leaf 1354 pointing 1360a to the VLB entry 1357b indicating that content of block 1364 is stored at LA3. The data blocks 1362, 1364 can denote user data blocks as described herein. In at least one embodiment, each MD leaf entry can be associated with a single logical address (e.g., LUN and LBA) which is further mapped to or associated with content stored at the single logical address.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field 1302a can be a reference count or counter indicating the number of instances of, or references to, the particular data block 1362 (e.g., data block pointed to by 1302b).

In at least one embodiment, the reference count 1301a can be initialized to 0 and used when the associated data block 1362 becomes a candidate for deduplication. As long as the data storage system includes at least one instance of, and thus at least one reference, to the data block 1362, the reference count 1301a will be non-zero. The reference count 1301a becomes zero when all instances of, or references to, the data block 1362 are deleted. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

In at least one embodiment, the reference count 1302a can be initialized to 0 and used when the associated data block 1364 becomes a candidate for deduplication. As long as the data storage system includes at least one instance of, and thus at least one reference, to the data block 1364, the reference count 1302a will be non-zero. The reference count 1302a becomes zero when all instances of, or references to, the data block 1364 are deleted. In this example, the reference 1302a is 1 indicating that there is 1 instances of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data. Each such reference to a single copy of stored data can be, for example, a logical address such as a LUN and LBA where the referenced data is stored at the logical address.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 6A-D.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 6A-D. In at least one embodiment, the MD or mapping information used in connection with stored user data can be stored on non-volatile storage, such as on the BE PDs of the appliance or data storage system. At least some of the MD or mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 6A-D.

In at least one embodiment, updates or modifications to the MD pages of the MD or mapping structure described in connection with the FIGS. 6A-D can also similarly be recorded in entries or records of a persistently stored metadata (MD) log and then flushed or destaged from the metadata log to persistent BE storage of the BE PDs. In at least one embodiment, the MD pages of the MD or mapping structure such as described in connection with the FIGS. 6A-D can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing, a metadata log can be used where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log (e.g., sometimes denoted as MD log) as stored on a log tier of non-volatile storage or memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 6A-D).

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

A data storage system can perform different data services such as data deduplication discussed elsewhere herein to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6D and discussion above regarding FIG. 6D. In at least one embodiment using the MD structures as described, for example, in connection with FIGS. 6A-D, the reference count associated with a data block can be included in an entry of a VLB page associated with the data block. For example with reference to FIG. 6D, the VLB entry 1357a includes a field 1301a with the reference count=2 for the associated data block 1362; and the VLB entry 1357b includes a field 1301a with the reference count=1 for the associated data block 1364.

The reference count such as of the VLB entries 1357a, 1357b, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified (e.g., such as by overwriting the same logical address multiple times with different write data) or deleted to no longer be considered a duplicate of the single existing copy.

In at least one system, updates to the MD page can be stored in the metadata log, where the logged MD update is persistently stored in the non-volatile memory metadata log (stored in non-volatile storage which can be NVMRAM) and where the logged MD update is also stored in an in-memory log structure in each node's local volatile memory. In the in-memory log structure in at least one embodiment, each individual update to a particular MD page can be recorded as a separate entry in a bucket of updates associated with the particular MD page. Subsequently, the updates to the MD page as recorded in the in-memory metadata log can be destaged and applied to a persistently stored copy of the MD page. Logging the MD updates such as to the reference count of the MD page can result in improved performance.

In at least one embodiment of a data storage system, user data or content located at logical addresses can be stored on multiple storage tiers of the BE PDs. A multi-tiered system can include multiple tiers of storage devices. Each tier can include non-volatile storage devices of one particular performance classification such that the tiers can be ranked in terms of relative performance. For example, in at least one system, the tiers can include a first tier 1 of non-volatile SSDs, such as a tier of flash-based drives, and a second tier 2 of HDDs (hard disk drives) or rotating disk drives, where tier 1 is a higher performance tier than tier2. Put another way and more generally, drives of tier 2 can be characterized as a relatively slower performance media than drives of tier1.

In some multi-tiered systems as noted above, the amount of SSD capacity of the higher performance tier for storing user data can be generally much smaller than the HDD capacity of the lower performance tier for storing user data. In at least one system, the SSDs can also effectively act like a write through cache. Since the amount of SSD capacity (e.g., capacity of the higher performance tier) can generally be much less than the HDD capacity (e.g., capacity of the lower performance tier), not all user data can be stored in the SSD tier. As a result, one or more criteria can be specified and used to decide what particular portions of user data or content are stored in each of the SSD tier and the HDD tier.

Described in the following paragraphs are techniques that can be used to efficiently track and update one or more metrics of different stored content or data portions, where the metrics characterize the temperature of the corresponding content or data portions. In at least one embodiment, the tracked metrics can be used to determine placement of stored content or data portions. In at least one embodiment, the one or more metrics can be used to determine what content or data portions from the HDD tier to promote to the SSD tier. In at least one embodiment, the one or more metrics can be used to determine what content or data portions from the SSD tier to demote to the HDD tier. The one or more metrics can generally be used to determine a temperature of stored content or an associated data portion and can be used in any suitable application, such as demotion and promotion between tiers noted above, as well as other applications.

In at least one embodiment, the criteria used to decide what particular portions of user data or content are stored in each of the multiple tiers can include the one or more metrics characterizing the activity, temperature, or frequency of access of the stored content or user data portions. In at least one embodiment, the criteria can also specify that the user data with the highest activity level or temperature is stored in the SSD tier and other user data which has a relatively lower activity level or temperature is stored in the HDD tier. Over time, the activity level or temperature of the stored user data can change such that, for example, "hot" data which has a high activity level or temperature (frequently accessed) can become "cold" with a low activity level or temperature. In a similar manner, user data that is cold with a relatively low activity level or temperature can become hot as the frequency of access of the user data increases. In this manner, the activity level or temperature of different data portions can be used to determine what data portions to move or migrate between the HDD and SSD tiers. For example, data stored in the SSD tier which was hot and becomes cold can be demoted from the SSD tier to the HDD tier whereby the data is moved from the SSD tier to the HDD tier. In a similar manner, data stored in the HDD tier which was cold and becomes hot can be promoted from the HDD tier to the SSD tier whereby the data is moved from the HDD tier to the SSD tier.

The foregoing and other aspects of the techniques of the present disclosure are described in more detail in the following paragraphs.

Figure 7A:
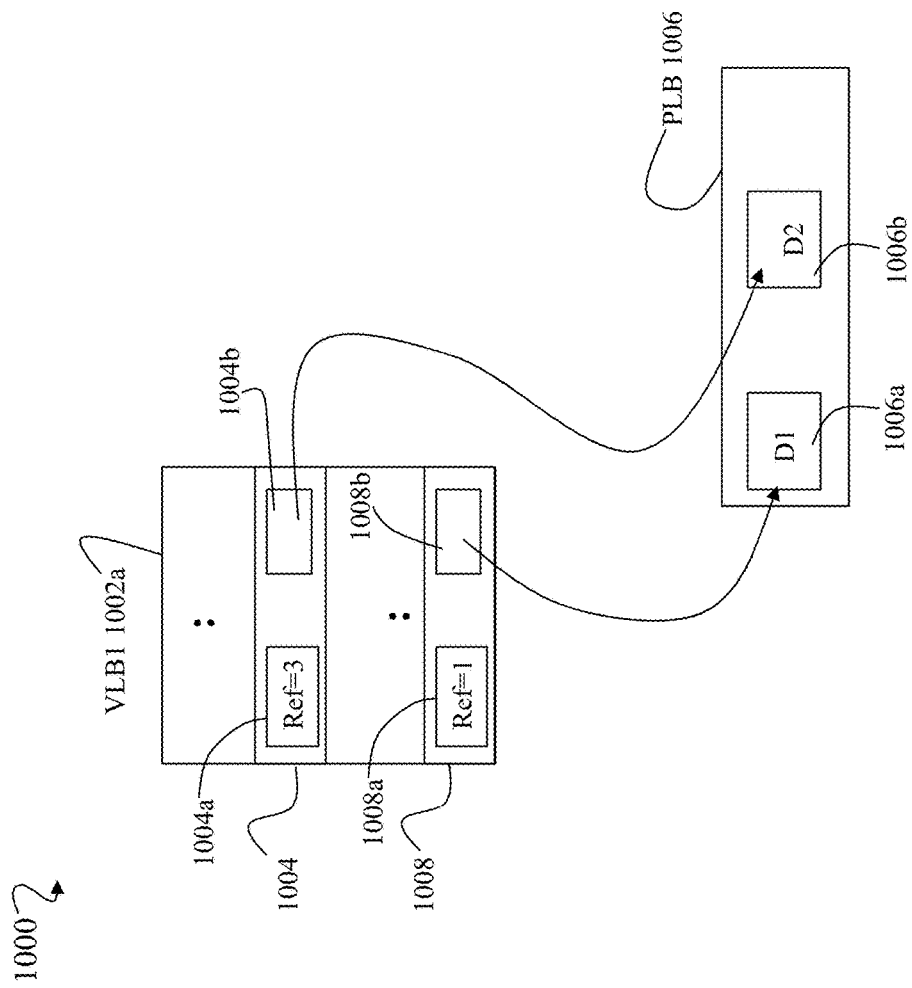
FIGS. 7A and 7B are examples illustrating structures that can be used in at least one embodiment in accordance with the techniques of the present disclosure.

Referring to FIG. 7A, shown is an example 1000 providing further detail regarding entries of a VLB and corresponding referenced content or user data stored on BE PDs in at least one embodiment in accordance with the techniques of the present disclosure.

In at least one embodiment, the mapping information of MD structures, which map a logical address to content or user data stored at the logical address, can be established or updated as a result destaging an entry of the log (e.g. UD log), where the entry denotes a write operation writing content or data to the logical address.

The example 1000 includes VLB 1002*a* which is similar to other VLBs described above, for example in connection with FIG. 6D. The physical block or PLB 1006 can correspond to a data block such as, for example, one of the data blocks 1362, 1364 of FIG. 6D. In at least one embodiment, each PLB 1006 can be further partitioned into smaller units of storage such as multiple data pages. For example in at least one embodiment, each PLB can be 2 MB in size where the PLB can be further partitioned into 4K byte pages. The elements 1006*a-b* can denote 2 such smaller units of storage, such as 4K byte pages, each storing user data or content referenced by a VLB entry. In the example 1000, the VLB entry 1004 includes a reference count 1004*a*=3 and an associated pointer 1004*b* to the stored content "D2" in the 4K page 1006*b*. In the example 1000, the VLB entry 1008 includes a reference count 1008*a*=1 and an associated pointer 1008*b* to the stored content "D1" in the 4K page 1006*a*.

In at least one embodiment, content or data associated with a single VLB can be stored in the same single PLB. However, not all entries of the VLB may be utilized. For example, the VLB may be sparsely populated, or more generally, less than all entries of a single VLB 1002*a* can be mapped to 4K data portions in the single PLB 1006. As a result, multiple VLBs can have their associated content stored in the single PLB. More generally, one or more VLBs can mapped to the same single PLB.

Figure 7B:
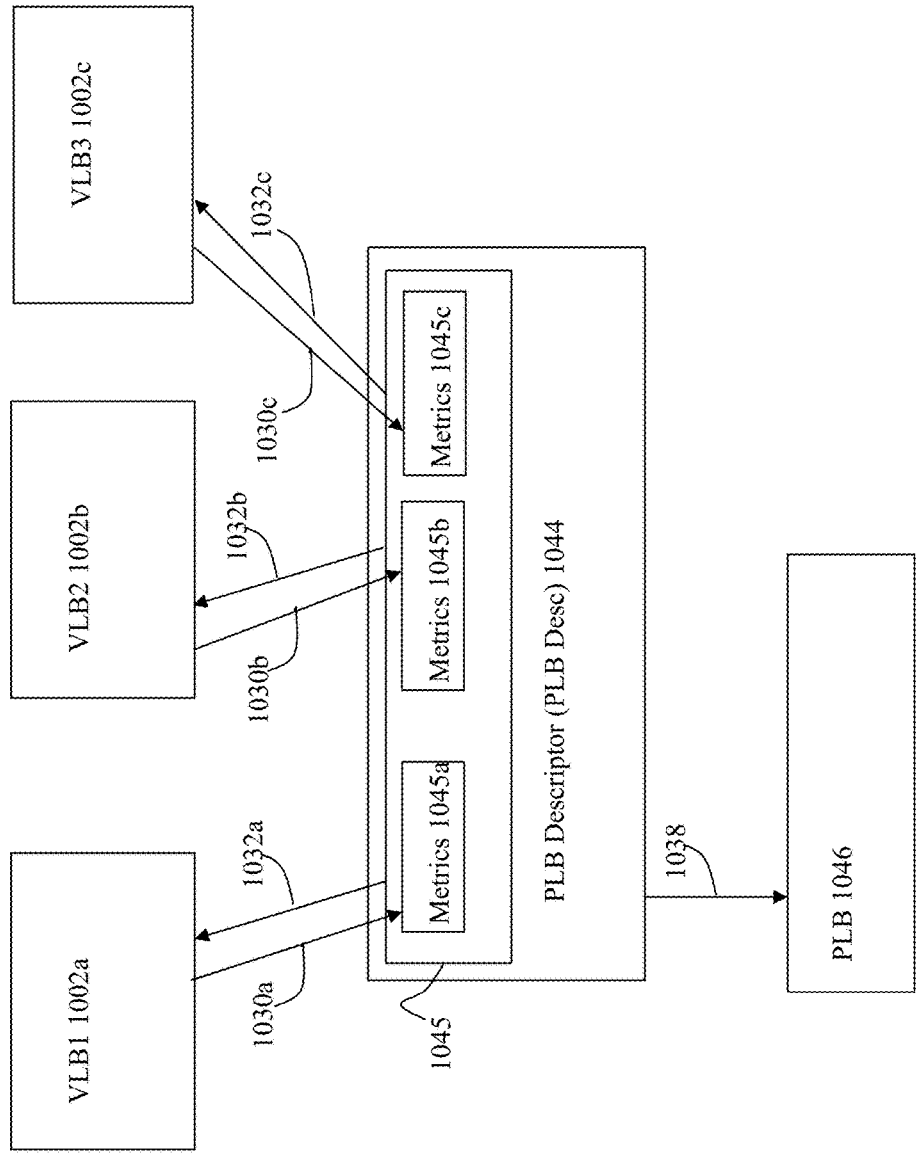

Referring to FIG. 7B, shown is an example 1001 illustrating various pointers and associated between structures which can be used in connection with the techniques of the present disclosure in at least one embodiment.

As noted above, generally one or more VLBs can have their referenced or associated content stored in a single PLB. The example 1001 illustrates 3 VLBs 1002*a-c* which can have their associated content stored in the single PLB 1046 in a manner as described in more detail above. The PLB descriptor (PLB desc) 1044 can generally be a structure that describes the PLB 1046. For example, the PLB desc 1044 can include a pointer 1038 to the PLB 1046 identifying the address or location of the PLB 1046 on the BE PDs. The PLB desc 1044 can also include other information such as the metrics or statistics 1045 characterizing the activity level of the VLBs 1002*a-c*. Examples of the metrics or statistics 1045 which can be tracked and maintained for VLBs are discussed in more detail below.

Each of the VLBs 1002*a-c* can respectively point to (1030*a-c*) the PLB desc 1044 associated with the PLB 1046 containing content referenced by the VLBs 1002*a-c*. In a similar manner, the PLB desc 1044 can include pointers 1032*a-c* respectively to the VLBs 1002*a-c* which also reference or point to the PLB desc 1044. In particular in at least one embodiment, the pointer 1030*a* can reference the address of the particular set of metrics 1045*a* tracked for the VLB 1002*a*; the pointer 1030*b* can reference the address of the particular set of metrics 1045*b* tracked for the VLB 1002*b*; and the pointer 1030*c* can reference the address of the particular set of metrics 1045*c* tracked for the VLB 1002*c*.

Thus, as illustrated in the example 1001, each VLB points to its associated set of metrics in a PLB descriptor associated with a PLB, where the PLB contains content mapped to a VLB entry of the VLB. Put another way, the VLB points to its associated set of metrics in a PLB descriptor of a PLB which stores content for a logical address mapped to a VLB entry of the VLB.

In at least one embodiment, content or data associated with a single VLB can be stored in the same single PLB. However, not all entries of the VLB may be utilized. For example, the VLB may be sparsely populated, or more generally, less than all entries of a single VLB can be mapped to 4K data portions in the single PLB. As a result, multiple VLBs can have their associated content stored in the single PLB. More generally, one or more VLBs can mapped to the same single PLB and its associated PLB descriptor, where the one or more VLBs reference content stored in the single PLB.

In at least one embodiment, the metrics or statistics tracked for each VLB can include a read temperature (denoting read activity) and a write temperature (denote write activity) with respect to data or content referenced by the VLB. In at least one embodiment, the read temperature of a VLB describes the read activity or read score of the VLB relative to the recency and frequency of read misses or read cache misses for content or data referenced by the VLB. In at least one embodiment, the write temperature of a VLB describes the write activity or write score of the VLB relative to the recency and frequency of overwrites with respect to content or data referenced by the VLB (e.g., where the content or data referenced by the VLB denotes the current content stored at a logical address where the logical address is overwritten with new content or data).

In at least one embodiment, each of the sets or metrics 1045*a-c* for a corresponding one of the VLBs 1002*a-c* can include the following information: the last or most recent read temperature for the VLB, the last or more recent write temperature for the VLB, a read timestamp denoting the time of the last or most recent read temperature, and a write timestamp denoting the time of the last or most recent write temperature.

In at least one embodiment, the read temperature of a VLB with respect to stored content of the VLB can be expressed in terms of read misses. In at least one embodiment, the number of read misses for the VLB can be the number of read misses experienced for each VLB entry reference to content stored in the PLB. With reference back to FIG. 6D, each VLB entry such as 1357*a* can include a pointer field 1301*b* with points to or references (1359*a*) a 4K page address in the data block 1362. Thus, the field 1301*b* can include the address Al of the 4K page of content stored at a logical address LAx. When performing a read for the logical address LAx which has an associated MD leaf entry mapped to the VLB entry 1358, a read cache miss can occur if the content stored at the address Al is not already stored in the volatile memory cache.

In at least one embodiment, the write temperature of a VLB with respect to stored content of the VLB can be expressed in terms of overwrites with respect to logical addresses mapped to entries of the VLB (e.g., where content associated with the VLB/entries of the VLB is stored at the logical addresses). Consistent with other discussion herein, for example, such as with respect to FIG. 5B, first data D1 can be stored at a logical address LA1. Subsequently, LA1 can be overwritten with a write I/O that writes new data N1 to LA1 such that N1 overwrites D1 with respect to LA1. However, in a log structured system as described herein in at least one embodiment, D1 can be persisted at a first physical storage location P1 and the new data N1 does not overwrite P1 but rather N1 is persisted to a second different physical storage location P2. Such an overwrite in at least one embodiment results in decrementing the reference count (ref count or counter) associated with the content D1 which is mapped to a VLB entry. In such an embodiment, the overwrite can be determined, detected and counted as an occurrence of a decrement reference counter or DECREF operation with respect to the reference count of the VLB entry associated with the content D1. For example with reference back to FIG. 6D, a DECREF MD update operation with respect to the reference count 1301a of the entry 1357a of the VLB 1358 can denote an overwrite of a logical address which is mapped to the entry 1357a. In at least one embodiment, overwrites can generally include write operations or other operations which result in storing new data to a logical address. In at least one embodiment, overwrites can also include operations which result in deleting a LUN or other storage entity so that the logical addresses of the LUN or storage entity are removed thereby reducing references to the content stored at such logical addresses. In at least one embodiment, overwrites used to determine the write temperature can denote any operation which results in a DECREF operation performed with respect to a reference count of stored content associated with a VLB entry.

The read temperature (RT) of a VLB, for a current time RTnew with an associated timestamp RTSnew, can be represented as RTnew. RTold for a VLB can denote the prior RTnew determined at a prior time Told having an associated timestamp RTSold. RTraw for a VLB can denote a raw read temperature or score regarding the number of cache misses associated with the VLB between the times RTSnew and RTSold. RTraw can denote the number of read cache misses experienced collectively for each VLB entry of the VLB where the VLB entry references content stored in the PLB, and the referenced content is not stored in cache (e.g., such that the referenced content or data needs to be read from the PLB of the BE PD and loaded into the cache for use in servicing the read request causing the read cache miss).

In at least one embodiment, RTnew for a VLB can generally be determined in accordance with RTraw, RTold, RTSnew and RTSold for the VLB. In at least one embodiment:

$$RTnew=(RTraw*W1)+(RTold*W2) \qquad \text{EQUATION 1A}$$

where W1 and W2 are weights. W2 can generally vary in accordance with the age of RTold such as based on the difference between RTSnew and RTSold. In at least one embodiment, the greater the difference and thus the older RTSold, the lower W2. In at least one embodiment, W1=1−W2, where W2 can be based on an exponential decay rate. In at least one embodiment, W2 can be expressed as:

$$W2=e^{Q1} \qquad \text{EQUATION 2A}$$

where the exponent Q1 can be expressed as:

$$Q1=-Alpha*deltaT \qquad \text{EQUATION 3A}$$

where

Alpha is the decay rate and deltaT is the time difference between RTSnew and RTSold More generally, RTnew can be expressed more generally as a function of RTraw, RTold, RTSnew and RTSold, and can be more formally represented as:

$$RTnew=F(RTraw, RTold, RTSnew, RTSold) \qquad \text{EQUATION 4A}$$

where "F" denotes a mathematical function indicating that RTnew is a function of RTraw, RTold, RTSnew, RTSold.

In at least one embodiment the write temperature (WT) of a VLB, for a current time Tnew with an associated timestamp WTSnew, can be represented as WTnew. WTold for a VLB can denote the prior WTnew determined at a prior time Told having an associated timestamp WTSold. WTraw for a VLB can denote a raw write temperature or score regarding the number of overwrites associated with the VLB between WTSnew and WTSold. In at least one embodiment, WTraw can be determined by counting the number of DECREF operations associated with the VLB between the time WTSold and WTSnew. WTraw can denote the number of DECREF operations experienced collectively for each VLB entry of the VLB where the VLB entry references content stored in the PLB, and the reference count of the entry associated with the content is decremented by 1.

$$WTnew=(WTraw*W1)+(WTold*W2) \qquad \text{EQUATION 1B}$$

where W1 and W2 are weights. W2 can generally vary in accordance with the age of WTold such as based on the difference between WTSnew and WTSold. In at least one embodiment, the greater the difference and thus the older TSold, the lower W2. In at least one embodiment, W1=1−W2, where W2 can be based on an exponential decay rate. In at least one embodiment, W2 as used with EQUATION 1B can be as expressed above in connection with EQUATIONs 2A and 3A with the differences that: Alpha of EQUATION 3A denotes the decay rate for write temperature (which can be different than a selected decay rate for read temperature); and deltaT of EQUATION 3A denotes the time different between WTSnew and WTSold.

More generally, WTnew can be expressed more generally as a function of WTraw, WTold, WTSnew and WTSold, and can be more formally represented as:

$$WTnew=F(WTraw, WTold, WTSnew, WTSold) \qquad \text{EQUATION 4B}$$

In at least one embodiment, each newly determined read temperature RTnew and write temperature WTnew can be scaled or mapped to an associated scaled relative temperature rating. In at least one embodiment, numerical boundaries or thresholds can be defined which map RTnew to one of multiple temperature ratings such as read hot, read warm and read cold. In at least one embodiment, numerical boundaries or thresholds can be defined which map WTnew to one of multiple temperature ratings such as write hot, write warm and write cold. To further illustrate, for RTnew, LB1 and LB2 can be defined within the range of possible values of RTnew where LB1<LB2, and where if RTnew<LB1, then RTnew is read cold;
if LB1≤RTnew≤LB2, then RTnew is read warm; and
if RTnew>LB2, then RTnew is read hot.

To further illustrate, for WTnew, LB3 and LB4 can be defined within the range of possible values of WTnew where LB3<LB4, and where if WTnew<LB3, then WTnew is write cold;
if LB3≤WTnew≤LB4, then WTnew is write warm; and
if WTnew>LB4, then WTnew is write hot.

Generally, LB1, LB2, LB3 and LB4 can be any suitable values. Also an embodiment can generally define any two or more temperature ratings or classifications with associated thresholds or boundaries rather than 3 classification for each of the RTnew and WTnew as illustrated above.

In at least one embodiment, RTraw for a VLB can denote the raw read temperature for the VLB determined from a set of inactive analytics tablets (i.e., discussed below in more detail) across multiple cores; RTold for the VLB can be the read temperature as recorded in one of the sets of metrics 1045 associated with the VLB; RTSold (as used when calculating RTnew based on RTraw and RTold) can denote the recorded timestamp of RTold; WTraw for a VLB can denote the raw write temperature for the VLB determined from a set of inactive analytics tablets across multiple cores; WTold for the VLB can be the write temperature as recorded in one of the sets of metrics 1045 associated with the VLB; WTSold (as used when calculating WTnew based on WTraw and WTold) can denote the recorded timestamp of WTold. In at least one embodiment, a set of metrics 1045 as recorded for a VLB can include the last or most recently stored read and write temperature information including RTold, RTSold, WTold, and WTSold, where such information can be used in calculating a next new value for WTnew and RTnew.

In at least one embodiment, RTraw of a VLB for a single collection period can denote a count of read misses associated with entries of the VLB, and WTraw of a VLB for a single collection period can denote a count of decrement reference counter operations (i.e., DECREF operations) associated with reference counters of entries of the VLB.

In at least one embodiment, various applications can utilize the last set of persistently stored sets of metrics 1045 for VLBs. In some scenarios and embodiments, some time may have elapsed since the last or most recent set of read and/or write temperature information was recorded in a set of VLB metrics 1045. For example, the persisted metrics for a VLB=VLBy may include a read temperature RT1 with an associated timestamp RTS1=12 pm (noon) on Sep. 9, 2022 and a write temperature WT1 with an associated timestamp=12 pm (noon) on Sep. 9, 2022. However, an application or use of the persistent metrics for the VLBy can be performed at 10 pm on Sep. 9, 2022 and no new revised sets of metrics may have been recorded for VLBy since 12 pm on Sep. 9, 2022. In at least one embodiment, the persisted metrics for the VLBy can be further adjusted based on the current time of use, Tcurr (e.g., 10 pm on Sep. 9, 2022), where there is no read or write activity since the times RTS1 and WTS1. Thus, a revised RTnew can be determined at time Tcurr based on the above-noted EQUATIONS 1A, 2A, 3A and 4A where RTraw=0 (denoting no read activity) so that RTnew (EQUATION 1A) reduces to (RTold*W2), where RTold is the last or most recently persisted read temperature RT1, and W2 (as determined in accordance with EQUATIONS 2A, and 3A) uses deltaT as a difference between RTS1 (which is RTSold) and the current time Tcurr (i.e., where Tcurr denotes the time of use and RTS1=RTSold denotes the last time the read temperature of the VLB metric set for VLBy was updated). In a similar manner, a revised WTnew can be determined at time Tcurr based on the above-noted EQUATIONS 1B, 2A, 3A and 4B (with differences noted above) where WTraw=0 (denoting no write activity) so that WTnew (EQUATION 1B) reduces to (WTold*W2), where WTold is the last or most recently persisted read temperature WT1, and W2 is determined using a deltaT as a difference between WTS1 (which is WTSold) and the current time Tcurr (i.e., where Tcurr denotes the time of use and WTS1=WTSold denotes the last time the write temperature of the VLB metric set for VLBy was updated).

In at least one embodiment, the data storage system can include multiple processing cores (sometimes also referred to as simply cores) which perform processing in connection with various operations. The operations can include those described herein, for example, to service read and/or write I/O operations. The operations can include performing read miss processing for a read I/O operation where the requested read data is not in cache. The operations can include performing write I/O operation processing where the write I/O can overwrite a logical address with new content. The operations can generally include any operation which results in a decrement reference count (DECREF) operation.

In such a multi core system, a core can generally denote an execution unit in a CPU that receives and executes instructions. In at least one embodiment, read misses and overwrites (e.g., which can include performing a DECREF operation) can be performed and/or processed simultaneously across multiple cores. To avoid contention across cores and to avoid multiple on-disk updates, the read misses and overwrites can be recorded in an in-memory data structure (stored in volatile memory) referred to herein as a tablet. Generally, the tablet contents can be analyzed and then used to update the various sets of metrics stored persistently for the VLBs.

Figure 8:
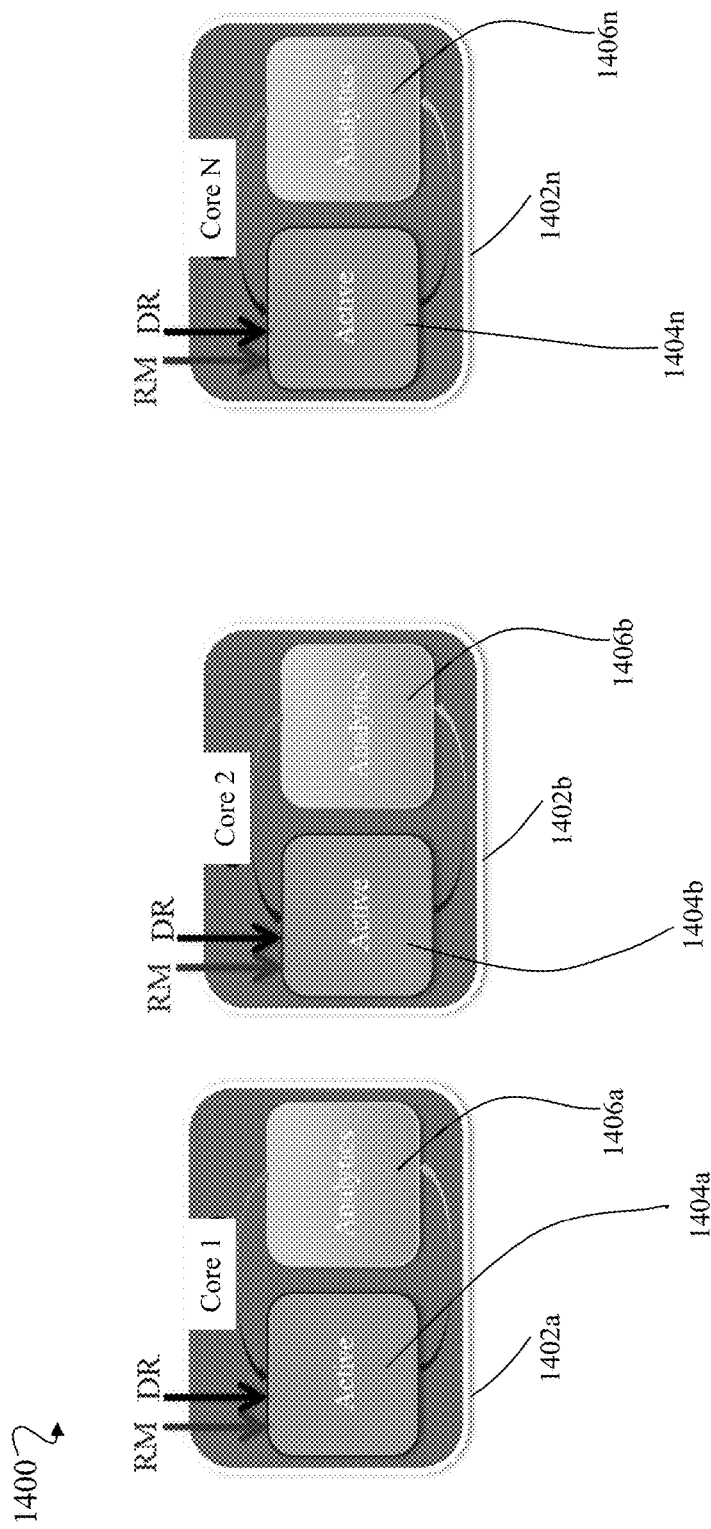
FIG. 8 is an example illustrating sets of tablets across multiple processing cores in at least one embodiment in accordance with the techniques of the present disclosure.

Referring to FIG. 8, shown is an example 1400 illustrating multiple cores in at least one embodiment in accordance with the techniques of the present disclosure.

The example 1400 includes N cores 1404a-n. Each of the processing cores 1402a-n can respectively include an active tablet 1404a-n and an analytics or inactive tablet 1406a-n. Each of the processing cores 1402a-n can respectively record the core's read miss (RM) and decref (DR) operations as entries or records in the core's respective active tablet 1404a-n. For example, the core 1402a can record an entry in its active tablet 1404a for each RM and each DR operation performed by the core 1402a. In a similar manner, each of the remaining cores 1402b-n can record RM and DR operations in the core's corresponding active table 1404a-n.

In one aspect, each of the cores has its own set or pair of tablets where only that core writes to its local active tablet. To further illustrate, reference is made to core 1402a and its tablets 1404a and 1406a although the following illustration similarly applies to the remaining cores 1402b-n and their respective associated tablets 1404b-n and 1406b-n. The core 1402a includes an active tablet 1404a and an analytics or inactive tablet 1406a. Since each of the tablets is an in-memory object, each tablet can only hold a finite amount of information. When the current active tablet 1404a becomes full, it transitions to the role of the inactive or analytics tablet; and the current analytics tablet 1406a can transition to the role of active. In other words, the roles of the two tablets can be continually swapped or switched from active to analytics or inactive. As noted above, the active tablet 1404a is the tablet to which the core 1402a actively records information regarding RMs and DR performed by the core 1402a. As the pair of active and analytic tablets are per core, there is no lock contention on a tablet update. The inactive or analytics tablet 1406a includes the records for the current core 1402a which needs to be analyzed and used to update the set of metrics tracked and maintained for the VLBs.

More generally as discussed in more detail in the following paragraphs, the tablet roles of active and analytics or inactive can be swapped or switched in response to an occurrence of one or more defined events which can be included in switching criteria.

In at least one embodiment, the switching criteria can specify a first condition that when any one of the N active tablets 1404a-n across the cores fills up or otherwise reaches a specified level of fullness, the respective roles of active and analytic or inactive tablets are swapped across all cores 1402a-n. For example, assume that the active table 1404a fills up or reaches a specified level of fullness (e.g., at least a threshold number of the entries of the active table 1404a are filled). In response in at least one embodiment, the roles of active and analytics or inactive tablets are swapped across all cores 1402a-n. In this manner, a set of collected data for the period or cycle can be all the entries of the active tablets 1404*a-n* of all cores 1402*a-n* where such current active tablets 1404*a-n* can then transition to the role of analytics tablets, and where current analytic or inactive tablets 1406*a-n* can transition to the role of active tablets. The set of collected data can be included in the new set of analytics tablets which can be analyzed.

In at least one embodiment, the switching criteria can specify a second condition that when a maximum amount of time elapses since the last active-analytics tablets swap across all cores 1402*a-n*, the respective roles of active and analytic or inactive tablets are swapped across all cores 1402*a-n*. The foregoing second condition can be used to avoid entries of the active tablets becoming aged where their relevance as indicating a current temperature of stored content can diminish with increased age.

In at least one embodiment, the switching criteria can specify a third condition that when at least X % or a minimum number of the N active tablets 1404*a-n* across the cores reaches a specified level of fullness (e.g., 70% full), the respective roles of active and analytic or inactive tablets are swapped across all cores 1402*a-n*.

In at least one embodiment, the switching criteria can generally include any one or more of the foregoing conditions as well as other suitable conditions which trigger switching or swapping of active and analytics tablets across all cores 1402*a-n*. In at least one embodiment where the switching criteria includes all three of the foregoing conditions, the respective roles of active and analytic or inactive tablets can be swapped across all cores 1402*a-n* responsive to any one of the foregoing 3 conditions occurring or evaluating to true.

Since the load and the activity across all the cores 1402*a-n* may not be the same, some of the active tablets 1404*a-n* can fill up faster than others. In at least one embodiment, to balance the load across all the tablets active tablets 1404*a-n*, the number of entries added to a particular one of the active tablets can be sampled, and each active tablet can have a different sampling rate based on the load of the particular core associated with the particular active tablet. For example, assume that core 1402*a* has the heaviest workload of all cores 1402*a-n*. As a result, the active tablet 1404*a* can fill up much quicker than any of the other active tablets 1404*b-n*. In response, entries recorded in the active tablet 1404*a* can be sampled, for example, to only record every $j^{th}$ entry, where "j" can be any suitable positive integer. For example, if the active tablet 1404*a* generally fills up at 5 times the rate as the other active tablets, then every $5^{th}$ entry can be recorded in the active tablet 1404*a* rather than record entries for every RM and DR performed by the core 1402*a*.

Referring to FIG. 9, shown is an example 1450 of tablets in at least one embodiment in accordance with the techniques of the present disclosure.

The tablet 1452 can generally denote the tablet structure and illustrate information which can be stored in entries of each of the active tablets 1404*a-n* and analytics tablets 1406*a-n*. The tablet 1452 includes the following columns: the column 1452*a* OP (operation) indicating whether the recorded operation is a RM or a DR; the column 1452*b* PLB IDX or PLB index; the column 1452*c* VLB address (ADDR); and the column 1452*d* range. Each entry of the table 1452 denotes information recorded for a particular operation. For example, the entry 1454 indicates that a RM (column 1452*a*) occurred with respect to content stored in the PLB identified uniquely by the PLBIDX=10 (column 1452*b*), where the content is referenced by a VLB entry in the VLB having the associated address or identifier VLB Addr=1001 (Column 1452*c*), and where range (1452*d*) of 2 indicates the size or number of pages of the PLB in connection with the RM.

Generally, each PLB can have a corresponding PLB IDX (column 1452*b*) which uniquely identifies the PLB with respect to all PLBs. Also, each VLB can be uniquely identified by an corresponding VLB addr denoting the pointer, address or an identifier of the VLB. The range (1452*d*) can generally denote a number of pages, such as 4K data pages, of a PLB which include content related to a recorded operation (OP).

Figure 10:
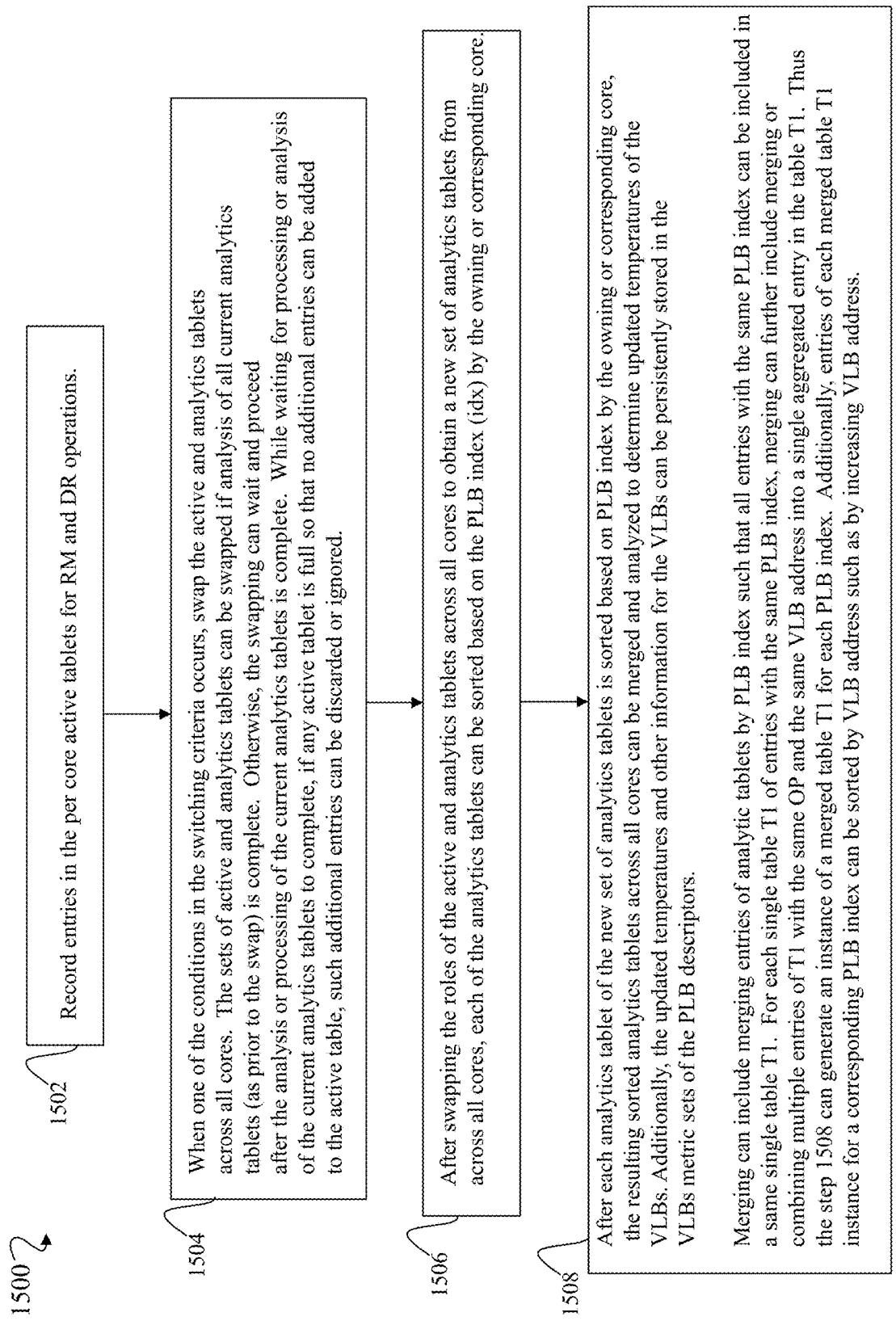
FIGS. 10 and 12 illustrate processing steps that can be performed in at least one embodiment in accordance with the techniques of the present disclosure.

Referring to FIG. 10, shown is a flowchart 1500 of processing steps that can be performed in at least one embodiment in accordance with the techniques of the present disclosure. The flowchart 1500 generally outlines tablet processing steps that can be performed in at least one embodiment in accordance with the techniques of the present disclosure.

At the step 1502, processing can be performed by the processing cores 1402*a-n* to record entries in the per core active tablets 1404*a-n* for RM and DR operations. From the step 1502, control proceeds to the step 1504.

At the step 1504, when one of the conditions in the switching criteria occurs, swap the active and analytics tablets across all cores. The sets of active and analytics tablets can be swapped if analysis of all current analytics tablets (as prior to the swap) is complete. Otherwise, the swapping can wait and proceed after the analysis or processing of the current analytics tablets is complete. While waiting for processing or analysis of the current analytics tablets to complete, if any active tablet is full so that no additional entries can be added to the active table, such additional entries can be discarded or ignored. From the step 1504, control proceeds to the step 1506.

At the step 1506, after swapping the roles of the active and analytics tablets across all cores to obtain a new set of analytics tablets from across all cores, each of the analytics tablets can be sorted, by the owning or corresponding core, based on the PLB index (idx). From the step 1506, control proceeds to the step 1508.

At the step 1508, after each analytics tablet of the new set of analytics tablets is sorted (in the step 1506) based on PLB index by the owning or corresponding core, the resulting sorted analytics tablets across all cores can be merged and analyzed to determine updated temperatures of the VLBs. Additionally, the updated temperatures and other information for the VLBs can be persistently stored in the VLBs' metric sets of the PLB descriptors.

In the step 1508, merging can include merging entries of the analytic tables from across the cores by PLB index such that all entries with the same PLB index can be included in a same single table T1. For each single table T1 of entries with the same PLB index, merging can further include merging or combining multiple entries of T1 with the same OP and the same VLB address into a single aggregated entry in the table T1. Thus the step 1508 can generate an instance of a merged table T1 for each PLB index. Additionally, entries of each merged table T1 instance for a corresponding PLB index can be sorted by VLB address such as by increasing VLB address.

What will now be described is further detail regarding the steps of the flowchart of FIG. 10.

With reference back to FIG. 9, assume at a first point in time P1 the table 1452 is one of the active tablets, such as 1404*a*, which is owned by one of the cores, such as core 1402*a*. In this case, the step 1502 includes the core 1402*a* recording entries in the tablet 1452 for DR and RM operations. At a second point in time P2 subsequent to P1, the step 1504 can be performed so that the role of the tablet 1452 switches to analytics so that the tablet 1452 is now one of the analytics tablets in the new set of analytics tablets after swapping roles of active and analytics tablets across all cores 1402*a-n*.

At a third point in time P3 after the time P2, the step 1506 can be performed. As part of the step 1506, the core 1402*a* can sort its current analytics tablet 1452 based on PLB index. For example, the sorting of the step 1506 can include the core 1402*a* sorting entries of the tablet 1452 based on increasing PLB index (idx) values as indicated in column 1452*c*. The tablet 1460 illustrates the result of the sorting of the step 1506 performed on entries of the table 1452. As can be seen, entries having the same PLB idx can be included in consecutive entries of the tablet 1460. For example, element 1462 denotes the entries of the sorted tablet 1460 with PLB idx=10; element 1462 denotes the entries of the stored tablet 1460 with PLB idx=100; and element 1464 denotes entries of the sorted tablet 1460 with PLB idx=2000.

At a fourth point in time P4 after P3, the step 1508 can be performed which includes merging entries across all analytics tablets from all cores with the same PLB idx so that such merged entries are included in a single table. Additionally, the step 1508 further includes sorting the merged entries of the single table based on the VLB address of each entry.

Figure 11:
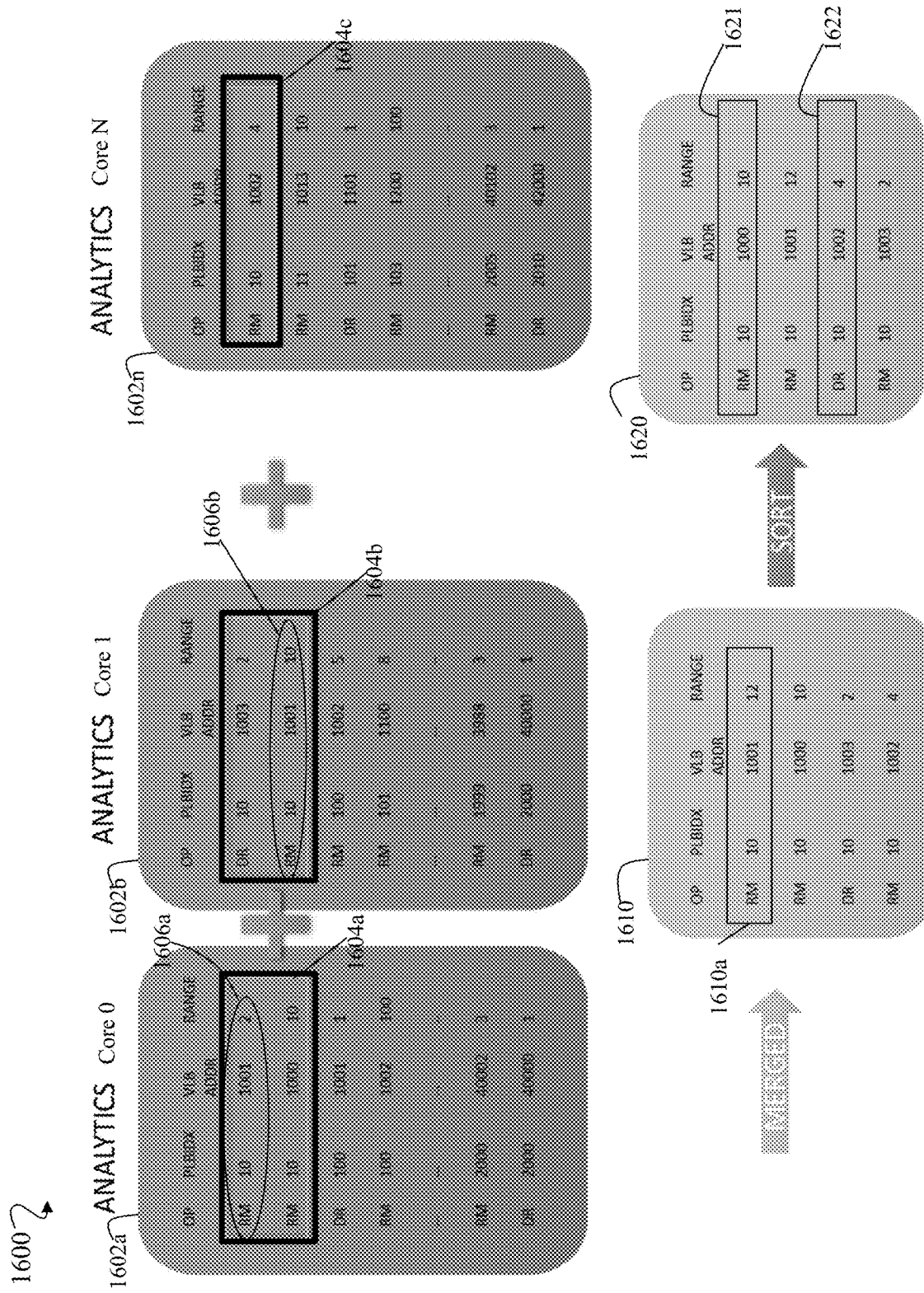

To further illustrate processing that can be performed in the step 1508, reference is made to the example 1600 of FIG. 11.

The example 1600 includes analytics tablets 1602*a-n* respectively of the cores 1-N 1402*a-n*. The step 1508 includes merging entries across all analytics tablets 1602*a-n* with the same PLB index or idx as denoted by the second column of the tablets 1602*a-n*. For example, the step 1508 includes merging entries from the tablets 1602*a-n* for PLB index=10. In the example 1600, the element 1604*a* denotes entries of 1602*a* which include PLB index=10; the element 1604*b* denotes entries of 1602*b* which include PLB index=10; and the element 1604*c* denotes entries of 1602*n* which include PLB index=10. Thus, the entries from 1606*a-c* can be merged into a single table instance 1610.

Additionally, the step 1508 includes further merging or combining multiple entries from across the tablets 1602*a-n* with PLB index=10 where such multiple entries have the same OP and the same VLB address (addr) as denoted, respectively, in the first and third columns of the tablets 1602*a-n*. In the example 1600, the entry 1606*a* of the tablet 1602*a* and the entry 1606*b* of the tablet 1602*b* have the same OP=RM and the same VLB addr=1001, where the entries 1606*a* and 1606*b* can be combined into a single entry 1610*a* in the merged table 1610. For such multiple entries 1606*a-b* which are combined into a single aggregated entry 1610*a* in the resulting merged table 1610, the range of the single entry 1610 can be the sum of the ranges of the multiple entries 1606*a-b*. In this example, the sum of the ranges of 1606*a-b* is 12 as denoted by the range of the single aggregated or combined entry 1610*a* in the table 1610.

The step 1508 additionally includes sorting the resulting merged table 1610 including merged entries for the single PLB index=10, wherein the sorting is by VLB address as included in the third column of the table 1610. In at least one embodiment, entries of the merged table 1610 can be sorted based on increasing VLB address. In the example 1600, the element 1620 denotes the resulting table after sorting the merged table 1610 based on increasing VLB address. Analysis can be performed on the aggregated information in the table 1620 to accordingly update the read and write temperatures and information of the VLBs metric sets as stored in the PLB descriptor associated with the PLB index=10. In the example 1600, information in the table 1620 can be analyzed and used to update the read and write temperature information of the VLBs metric sets for the VLB addresses 1000, 1001, 1002 and 1003 (as denoted by the third column of the table 1620).

In a similar manner to that as described in connection with FIG. 11 for the PLB index=10, processing of the step 1508 can generally include merging and sorting entries of the tables 1602*a-n* from across the cores in a similar manner for each unique PLB index, where such merged and sorted entries are included in a single resultant table. The resultant table, like the table 1620, can be used to update the metric sets of the VLBs based on the VLB addresses in the resultant table.

What will now be described is further detail regarding processing that can be performed in at least one embodiment in accordance with the techniques of the present disclosure.

After the tablets are sorted by their respective owning core (e.g., step 1506), a job manager can be launched. The job manager can generally be a process, program or other code entity which controls and regulates the number of existing jobs in a system. Each job can perform processing or work in connection with generating one or more merged sorted tables. In at least one embodiment, each job can be a thread, process, or other code entity which can generally perform processing as described, for example, in connection with FIG. 11 to generate one or more merged sorted tables of entries. Each merged sorted table can be similar to the table 1620 which includes, for a single PLB index, merged sorted entries from a set of analytics tablets (1602*a-n*) from across the cores. Additionally, each job can further perform analysis of each merged sorted table the job generates. In at least one embodiment for example, a job J1 can generate the table 1620 for the PLB index=10. Additionally, the job J1 can further analyze the information in the table 1620 to generate a new set of metrics including temperature information for VLBs having corresponding VLB addresses in the third column of the table 1620. For example with reference to the row 1621 of the table 1620, the job J1 can use the information in the row 1621 to generate a new revised read temperature for the VLB with the VLB address=1000. Consistent with other discussion herein regarding EQUATIONS 1A, 2A, 3A and 4A, J1 can calculate the new or revised read temperature for the VLB where, in such equations, the revised read temperature can be denoted as RTnew, the timestamp (e.g., current time) associated with RTnew can be RTSnew, the current persisted read temperature for the VLB can be RTold, and the current persisted timestamp corresponding to RTold can be RTSold. Additionally, J1 can update the persistently stored read temperature and associated timestamp, respectively, to be the revised read temperature (RTnew) just calculated for the VLB address 1000 and its associated timestamp (RTSnew). Consistent with other discussion herein, J1 can persistently store the updated read temperature and associated timestamp in the set of metrics for the VLB, where the set of metrics can be included in the PLB descriptor of the PLB including content referenced by entries of the VLB. In at least one embodiment, the range=10 of the row 1621 can denote the RM count or frequency used as RTraw.

To further illustrate processing and analysis performed by J1, reference is also made to the row 1622 of the table 1620. The job J1 can use the information in the row 1622 to generate a new revised write temperature for the VLB with the VLB address=1002. Consistent with other discussion herein regarding EQUATIONS 1B, 2A, 3A and 4B, J1 can calculate the new or revised write temperature for the VLB where, in such equations, the revised write temperature can be denoted as WTnew, the timestamp (e.g., current time) associated with WTnew can be WTSnew, the current persisted write temperature for the VLB can be WTold, and the current persisted timestamp corresponding to WTold can be WTSold. Additionally, J1 can update the persistently stored write temperature and associated timestamp, respectively, to be the revised write temperature (WTnew) just calculated for the VLB address 1001 and its associated timestamp (WTSnew). Consistent with other discussion herein, J1 can persistently store the updated write temperature and associated timestamp in the set of metrics for the VLB, where the set of metrics can be included in the PLB descriptor of the PLB including content referenced by entries of the VLB. In at least one embodiment, the range=4 of the row 1622 can denote the DR count or frequency used as WTraw.

In at least one embodiment, the job manager can launch jobs across multiple cores to process entries of the set of sorted analytics tablets from across the cores. In at least one embodiment, the job manager may perform processing to maintain N, a specified or requested number, of jobs running across multiple cores simultaneously or in parallel. Generally, the number of jobs launched by the job manager can also be adjusted based on the amount of time X1 one of the active tablets for a core becomes full to ensure that the processing of the current set of analytics or inactive tablets completes within a required amount of time such as prior to the amount of time X1 elapsing.

In at least one embodiment, if an active tablet becomes full (e.g., so that there are no free entries in the active table to store new entries) prior to completing required processing and analysis of the current set of analytics tablets, any new entries directed to the full active tablet can be discarded or ignored. Discarding any such new additional entries is performed since the full active tablet (and other active tablets) cannot yet be swapped and transition the role of analytics tablet as the current set of analytics tablets are still being processed.

In at least one embodiment, in a heavily loaded system, to prevent any of the active tablets from filling/becoming full before the current set of analytics tablets can be processed, the entries added to the active tablets can be sampled. In such an embodiment, the sampling rate can vary in accordance with the progress of the processing and analysis of the current set of analytics tablets. Generally, an embodiment can keep a balance between Y1, the amount of time it takes to collect a set of active tablets and trigger (in accordance with specified switching criteria) a swap or switch of the active and analytics tablets across the cores, and Y2, the amount of time it takes to complete processing a set of analytics tablets (e.g., where such processing can include: the merging and sorting of analytics tablets from across the cores to generate resulting tables per PLB index, calculating revised or updated temperature metrics for VLBs using the merged resulting tables, and persistently storing in a PLB descriptor updated metrics including the revised temperature metrics and associated timestamps for VLBs. In at least one embodiment, a condition or requirement can be specified that Y1 can be greater than Y2 by at least a minimum amount of time M1. If Y2 is greater than Y1, or more generally, Y1 and Y2 does not meet the foregoing requirement, then one or more actions can be taken. For example, consider a first scenario where at least one of the active tablets completely fills in 10 seconds thereby triggering a swap or switch across all cores of the active tablets and the analytics tablets. Also in the first scenario, assume it takes 8 second to process the complete current set of analytics tablets whereby after 8 seconds, the complete set of analytics tablets from across the cores can be swapped or switched with the active tablets across the cores. In the first scenario, Y1=10 seconds and Y2=8 seconds so the swap or switch of tablets across the cores can be performed with further delay or waiting. However, now consider a second scenario where Y1 is 4 seconds rather than 10 seconds. In the second scenario, it may be that one or more of the cores each has a very heavy workload and now fills its active tablet completely in 4 seconds thereby meeting specified switching criteria and thereby triggering a swap or switch of active and analytics tablets across the cores. However, in the second scenario, the swap or switch of active and analytics tablets across the cores can be delayed an additional 4 seconds until the processing of the current set analytics tablets completes. In response to this second scenario, the entries added to the one or more active tablets of the one or more heavily loaded cores can be sampled in efforts to reduce the rate at which such active tablets fill up. As a third scenario, consider a case where all the cores are heavily loaded such that all cores fill their respective active tablets on average in 4 seconds. In response, entries added to all the active tablets can be sampled. In the third scenario if Y1 is 4 seconds and Y2 is 8 seconds, then, for example, for all active tablets, every $2^{nd}$ entry of each active tablet of one of the cores can be sampled in order to reduce the rate at which such active tablets fill up. For example, if the processing of the current set of analytics tablets progress can't keep up the IO activity and the active tablets are getting filled up quickly, the sampling rate can change from every second, for example, to every 5th second.

In at least one embodiment, one or more other actions can also be taken to attempt to maintain a balance between Y1 and Y2 as can be expressed in the above-noted condition of requirement. As another action, the job manager can vary the number of jobs launched and in progress at different points in time to ensure that processing of the current set of analytics tablets completes within a specified amount of time. For example, assume Y1<Y2. In this case, the job manager can increase the number of jobs executing in the system to process the set of analytics tablets in order to reduce Y2 to be less than Y1.

Figure 12:
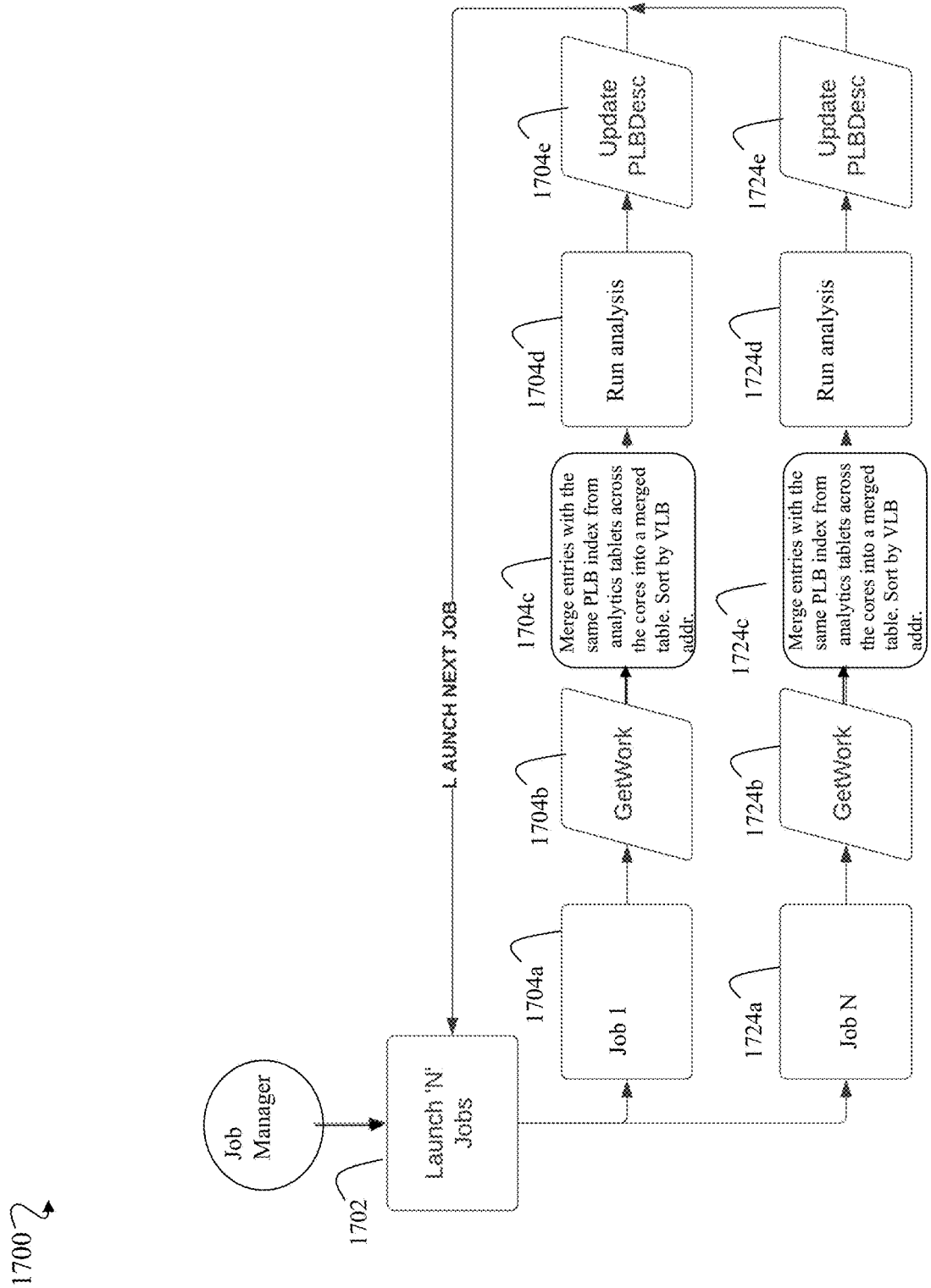

Referring to FIG. 12, shown is an illustration 1700 of workflow processing that can be performed in at least one embodiment in accordance with the techniques of the present disclosure.

The example 1700 generally illustrates the workflow performed in connection with the job manager and created jobs in at least one embodiment in accordance with the techniques of the present disclosure. At the step 1702, the job manager can launch or create N jobs such as on the N cores of the system, where one of the N jobs can commence processing on a corresponding one of the N cores.

Elements 1704*a-e* illustrate processing that can be performed for Job 1 1704*a* which can execute on core 1 (e.g., 1402*a* of FIG. 8). Generally each launched job can perform processing for one or more unique PLBs where each PLB can be uniquely identified by its associated PLB index. Thus for example for illustrative purposes, assume that each job performs processing for a single PLB and thus single PLB index. At the getwork step 1704*b*, job 1 can receive from the job manager the PLB index K1 of the PLB for which job1 performs processing. From the step 1704*b*, job1 progresses to the step 1704*c*. In the step 1704*c*, job1 can generally perform processing as described in connection with FIG. 11. In the step 1704*c*, job1 can perform processing to merge entries of the analytics tables from across the cores into a single merged table, where such entries each include a field with the PLB index=K1 (job 1's assigned PLB index). Additionally, in the step 1704c, job1 can sorted the merged entries of the table based on the VLB addr of each entry. From the step 1704c, job 1 processing proceeds to the step 1704d to analyze the information of the sorted merged table for the single PLB index=K1. The step 1704d can include determining revised or updated read and write temperatures for VLBs using the information of the sorted merged table for PLB index=K1. The step 1704d can include performing calculations in accordance with the equations described elsewhere herein. From the step 1704d control proceeds to the step 1704e where job1 can persistently store updated temperature metrics and associated timestamps for VLBs in the PLB descriptor for the PLB with PLB index=K1. Following the step 1704e, job1 has completed its processing and the job manager can proceed to launch another job to process entries of analytic tablets for another PLB.

In a similar manner, each of the remaining launched jobs 2 through N can perform processing independently of all other jobs. Also in a similar manner, once each of the jobs 2 through completes, the job manager can launch another job for execution to process entries of the analytics tablets for another PLB. Generally, the job manager can continue to launch jobs to process entries of the analytics tablets for PLBs until there are no more entries and thus no remaining PLBs to be assigned to jobs for processing. The elements 1724b-e outline processing which can be performed by the job 1724a. Each of the elements 1724b-e for job N 1724a correspond respectively to elements 1704b-e for the job 1 1704a, where each of the elements 1724b-e include processing similar to that described above elements 1704b-e.

Generally, the sets of metrics including read and write temperatures and associated timestamps for VLBs can be utilized in any suitable application. For example, the sets of metrics for VLBs having content stored in one or more PLBs can be used to determine where to locate or store such content in a multi tiered system. To further illustrate, reference is made back to FIG. 7B for the PLB 1046 where 3 VLBs 1002a-c have content stored in the PLB 1046. Assume the data storage system includes BE PDs including a first tier 1 of non-volatile SSDs and a second tier 2 of HDDs or rotating disk drives where tier 1 is a higher performance tier relative to tier 2. At a current time M1 the PLB 1046 can denote non-volatile storage of an SSD included in the tier1. Processing can be performed at the time M1 to determine what content or data of PLB, if any, can be demoted from tier1 to another PLB in tier2. In at least one embodiment as discussed elsewhere herein, assume that a read temperature of a VLB can be mapped to or classified as one of the following 3 classifications: read hot, read warm, or read cold; also assume that a write temperature of a VLB can be mapped to or classified as one of the following 3 classifications: write hot, write warm, or write cold. In at least one embodiment, a policy can be in effect or active which includes the following rules regarding data placement generally (e.g., data movement, promotion and demotion):

rule 1: read cold or write cold data which is stored in the SSD tier 1 is demoted from the SSD tier 1 to the HDD tier 2.

rule 2: read cold or write cold data which is stored in the HDD tier2 remains in the HDD tier 2.

rule 3: read hot or write hot data which is stored in the HDD tier 2 is promoted from the HDD tier 2 to the SSD tier 1.

rule 4: read hot or write hot data which is stored in the SSD tier 1 remains in the SSD tier 1.

rule 5: read warm or write warm data which is stored in the SSD tier 1 can remain in the SSD tier 1.

At the time current time M1, processing can be performed to determine a current read temperature RTnew and a current write temperature WTnew for the VLB 1002a using the last updated persistently stored set of metrics 1045a. The metrics 1045a can include a read temperature used as RTold, a timestamp RTSold of the persisted last updated read temperature RTold, a write temperature used as WTold, and a timestamp WT old of the persisted last updated write temperature WT old. Generally, RTnew and WTnew can be calculated consistent with other discussion and equations herein. For example, RTnew can be calculated consistent with discussion herein using EQUATIONS 1A, 2A, and 3A; and WTnew can be calculated consistent with discussion herein using EQUATIONS 1B, 2A and 3A. When calculating RTnew, the deltaT of EQUATION 3A is the time difference between M1 and RTSold, and RTraw of EQUATION 1A can be zero. When calculating WTnew, the deltaT of EQUATION 3A is the time difference between M1 and WTSold, and WTraw of EQUATION 1B can be zero. Once the current read temperature RTnew and current write temperature WTnew are calculated using the last updated metrics 1045a for the VLB 1002a, RTnew can be further mapped to one of the three read temperature classifications of read hot, read warm or read hold, and WTnew can be further mapped to one of the three write temperature classification of write hot, write warm or write cold. Based on the read temperature classification and the write temperature classification determined for the VLB 1002a, relevant rules of the above-noted policy can be applied to determine whether the content referenced by entries of VLB 1002a remains in the SSD tier 1, or is otherwise demoted to the HDD tier 2. Since in this example the PLB 1046 is storage of the SSD tier1, the rules 1, 4 and 5 are relevant and can be applied based on the read temperature classification and the write temperature classification of VLB 1002a. For example based on the rules 1, 4 and 5, if the read temperature classification of the VLB 1002a is read hot or read warm, content referenced by entries of VLB 1002a, where such content is stored in PLB 1046 can remain in PLB 1046 of the SSD tier 1. Similarly if the write temperature classification of the VLB 1002a is write hot or write warm, content referenced by entries of VLB 1002a, where such content is stored in PLB 1046 can remain in PLB 1046 of the SSD tier 1. If the read temperature classification of the VLB 1002a is read cold, content referenced by entries of VLB 1002a, where such content is stored in PLB 1046 can be demoted from the SSD tier 1 to the HDD tier 2. In this case, the content referenced by entries of VLB 1002a can be moved or migrated from the PLB 1046 of SSD tier 1 to another PLB of the HDD tier2. If the write temperature classification of the VLB 1002a is write cold, content referenced by entries of VLB 1002a, where such content is stored in PLB 1046 can be demoted from the SSD tier 1 to the HDD tier 2. In this case, the content referenced by entries of VLB 1002a can be moved or migrated from the PLB 1046 of SSD tier 1 to another PLB of the HDD tier2.

As another example, consider the case where the PLB 1046 is storage of the HDD tier 1 where, the rules 2 and 3 are relevant and can be applied based on the read temperature classification and the write temperature classification of VLB 1002a. For example based on the rules 2 and 3, if the read temperature classification of the VLB 1002a is read hot or read warm, content referenced by entries of VLB 1002a, where such content is stored in PLB 1046 can be promoted from the PLB 1046 of HDD tier 2 to another PLB of the SSD tier 1. In this case, the content referenced by entries of VLB 1002*a* can be moved or migrated from the PLB 1046 of HDD tier 2 to another PLB of the SSD tier1. If the read temperature classification of the VLB 1002*a* is read cold, content referenced by entries of VLB 1002*a*, where such content is stored in PLB 1046, can remain in the PLB 1046 of the HDD tier 2.

It should be noted that a conflict can occur in connection with application of the above policy rules, for example, where the VLB 1002*a* has one associated temperature classification that is hot and another associated temperature classification that is cold. For example consider the case where the PLB 1046 is in the SSD tier 1 and where the VLB 1002*a* is read hot and write cold. Application of rules 1, 4 and 5 can lead to a conflict in that rule 1 indicates that the content referenced by entries of VLB 1002*a* should be demoted from the SSD tier1 to the HDD tier 2 because of the write cold classification. In contrast, application of rule 4 indicates that the content referenced by entries of VLB 1002*a* can remain in the PLB 1046 in the SSD1 tier due to the read hot classification. In such a case, the foregoing conflict can be resolved in favor of placement of the data or content on the highest performance tier indicated by any of the rules so that content remains in the SSD tier1 because the VLB has at least one associated temperature classification of "hot" (e.g., either read hot or write hot). Generally, an embodiment can resolve any such conflicts in any suitable manner where such resolution can be specified by yet another rule of the policy.

As described above in connection with the VLB 1002*a*, similar processing can be performed in connection with each of the remaining VLBs 1002*b-c* to determine a corresponding read temperature classification and a corresponding write temperature classification for each of the VLBs 1002*b-c*, and then subsequently apply the policy rules to determine placement of the content referenced by each of the VLBs 1002*b-c*, where such referenced content is currently stored on the PLB 1046.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer implemented method comprising:
  recording, by a plurality of processing cores, occurrences of read misses and overwrites in entries of a first plurality of tablets designated as active tablets, wherein each of the plurality of processing cores has an associated pair of tablets including one of the first plurality of tablets and one of a second plurality of tablets designated as analytic tablets, wherein said each processing core records occurrences of read misses and overwrites in said one of the first plurality of tablets of the associated pair designated as an active tablet;
  determining, in accordance with one or more switching criteria, to switch roles of the first plurality of tablets and the second plurality of tablets;
  responsive to said determining, switching roles of the first plurality of tablets and the second plurality of tablets, wherein after said switching, the first plurality of tablets is designated as analytic tablets and the second plurality of tablets is designated as active tablets;
  merging, in accordance with physical block indices uniquely identifying physical blocks of storage, entries of the first plurality of tablets designated as analytic tablets, wherein said merging includes:
    generating one of a plurality of tables of merged entries for each of the physical block indices wherein said one table includes merged entries of the first plurality of tablets associated with said each physical block index, wherein each of the physical blocks of storage includes content referenced by one or more virtual blocks of a plurality of virtual blocks;
  updating, in accordance with the plurality of tables, a plurality of metric sets associated with the plurality of virtual blocks;
  determining, using a first of the plurality of metric sets for a first of the plurality of virtual blocks referencing first content stored on a first of the physical blocks of storage, first one or more temperature classifications of the first virtual block at a current point in time; and
  determining, in accordance with said first one or more temperature classifications of the first virtual block at the current point in time, placement of the first content referenced by the first virtual block in one of a plurality of storage tiers.

2. The computer-implemented method of claim 1, wherein each of the plurality of storage tiers has a relative performance ranking, and wherein the first content is currently stored in the first physical block of a first storage tier of the plurality of storage tiers.

3. The computer-implemented method of claim 2, wherein said determining placement of the first content includes:
  determining, in accordance with a policy, to move the first content from the first storage tier to a second of the plurality of storage tiers.

4. The computer-implemented method of claim 3, wherein responsive to said determining to move the first content from the first storage tier to the second storage tier, the method further includes:
  moving the first content from the first physical block of the first storage tier to a second physical block of the second storage tier.

5. The computer-implemented method of claim 4, wherein said moving is a demotion where the first storage tier has a higher relative performance ranking than said second storage tier.

6. The computer-implemented method of claim 4, wherein said moving is a promotion where the first storage tier has a lower relative performance ranking than said second storage tier.

7. The computer-implemented method of claim 1, wherein said first one or more temperature classifications determined at the current point in time include a read temperature classification determined in accordance with the current point in time and first information of the first metric set, wherein said first information of the first metric set includes a first read temperature of the first virtual block, and a first timestamp of the first read temperature.

8. The computer-implemented method of claim 1, wherein said first one or more temperature classifications determined at the current point in time include a write temperature classification determined in accordance with the current point in time and first information of the first metric set, wherein said first information of the first metric set includes a first write temperature of the first virtual block, and a first timestamp of the first write temperature.

9. The computer-implemented method of claim 1, wherein said generating said one table for said each physical block index includes combining a first entry of a first table of the first plurality and a second entry of a second table of the first plurality, wherein said first entry and said second entry each have a same operation and a same virtual block, wherein said same operation is one of a read miss or an overwrite.

10. The computer-implemented method of claim 9, wherein the first entry of the first table is recorded by a first of the plurality of processing cores, wherein said first entry indicates that said first processing core performed said same operation with respect to second content stored in a physical block uniquely identified by said each physical block index, wherein said second content is referenced by the same virtual block, and wherein the second entry of the second table is recorded by a second of the plurality of processing cores, wherein said second entry indicates that said second processing core performed said same operation with respect to third content stored in the physical block uniquely identified by said each physical block index, wherein said third content is referenced by the same virtual block.

11. The computer-implemented method of claim 1, wherein each occurrence of a read miss recorded in one of the plurality of first tablets while designated as an active tablet is recorded in an entry in said one tablet, and wherein each occurrence of a read miss denotes a read cache miss with respect to associated content referenced by one of the plurality of virtual blocks, and wherein said entry recorded includes an operation type of read miss, a physical block index of a physical storage block storing the associated content, a virtual block address or identifier corresponding to the one virtual block referencing the associated content, and a count denoting a number of data pages of the physical storage block storing the associated content.

12. The computer-implemented method of claim 1, wherein each occurrence of an overwrite recorded in one of the plurality of first tablets while designated as an active tablet is recorded in an entry in said one tablet, and wherein each occurrence of an overwrite denotes a decrement of a reference count of associated content stored on a physical storage block where the reference count is included in one of the plurality of virtual blocks referencing the associated content, and wherein said entry recorded includes an operation type denoting a reference count decrement, a physical block index of the physical storage block storing the associated content, a virtual block address or identifier corresponding to the one virtual block referencing the associated content, and a count denoting a number of data pages of the physical storage block storing the associated content.

13. The computer-implemented method of claim 1, wherein the switching criteria indicates to switch roles of the first plurality of tablets designated as active tablets and the second plurality of tablets designated as analytic tablets when at least one of the plurality of first plurality of tablets is full where the said one tablet has no free entries for recording additional operations.

14. The computer-implemented method of claim 1, wherein the switching criteria indicates to switch roles of the first plurality of tablets designated as active tablets and the second plurality of tablets designated as analytic tablets when at least a threshold number of the first plurality of tablets each have consumed at least a specified amount of entries in said each tablet.

15. The computer-implemented method of claim 1, wherein the switching criteria indicates to switch roles of the first plurality of tablets designated as active tablets and the second plurality of tablets designated as analytic tablets when a specified amount of time has elapsed since roles were last switched between the first plurality of tablets and the second plurality of tablets.

16. The computer-implemented method of claim 1, wherein the switching criteria indicates not to switch roles of the first plurality of tablets designated as active tablets and the second plurality of tablets designated as analytic tablets if processing of the second plurality of tablets designated as analytic tablets has not yet completed.

17. The computer-implemented method of claim 1, wherein a first of the plurality of processing cores has a higher relative workload in comparison to at least one or more others of the plurality of processing cores, wherein said first processing core records entries in a first of the first plurality of tablets designated as active tablets, wherein said first processing core records entries in the first tablet at a first sampling rate such that one out of every N read miss or overwrite operations performed by said first processing core is recorded in said first tablet, wherein N is an integer greater than one.

18. The computer-implemented method of claim 1, wherein a job manager launches a plurality of jobs to perform processing including said merging and said updating, and wherein said job manager varies a number of jobs launched to ensure said processing of the first plurality of tablets, when designated as analytic tablets, completes prior to any one or more of the second plurality of tablets, when designated as active tablets, becoming full.

19. A system comprising:
one or more processors; and
a memory comprising code stored thereon that, when executed, performs a method comprising:
recording, by a plurality of processing cores, occurrences of read misses and overwrites in entries of a first plurality of tablets designated as active tablets, wherein each of the plurality of processing cores has an associated pair of tablets including one of the first plurality of tablets and one of a second plurality of tablets designated as analytic tablets, wherein said each processing core records occurrences of read misses and overwrites in said one of the first plurality of tablets of the associated pair designated as an active tablet;
determining, in accordance with one or more switching criteria, to switch roles of the first plurality of tablets and the second plurality of tablets;
responsive to said determining, switching roles of the first plurality of tablets and the second plurality of tablets, wherein after said switching, the first plurality of tablets is designated as analytic tablets and the second plurality of tablets is designated as active tablets;
merging, in accordance with physical block indices uniquely identifying physical blocks of storage, entries of the first plurality of tablets designated as analytic tablets, wherein said merging includes:

generating one of a plurality of tables of merged entries for each of the physical block indices wherein said one table includes merged entries of the first plurality of tablets associated with said each physical block index, wherein each of the physical blocks of storage includes content referenced by one or more virtual blocks of a plurality of virtual blocks;

updating, in accordance with the plurality of tables, a plurality of metric sets associated with the plurality of virtual blocks;

determining, using a first of the plurality of metric sets for a first of the plurality of virtual blocks referencing first content stored on a first of the physical blocks of storage, first one or more temperature classifications of the first virtual block at a current point in time; and determining, in accordance with said first one or more temperature classifications of the first virtual block at the current point in time, placement of the first content referenced by the first virtual block in one of a plurality of storage tiers.

20. A non-transitory computer readable medium comprising code stored thereon that, when executed, performs a method comprising:

recording, by a plurality of processing cores, occurrences of read misses and overwrites in entries of a first plurality of tablets designated as active tablets, wherein each of the plurality of processing cores has an associated pair of tablets including one of the first plurality of tablets and one of a second plurality of tablets designated as analytic tablets, wherein said each processing core records occurrences of read misses and overwrites in said one of the first plurality of tablets of the associated pair designated as an active tablet;

determining, in accordance with one or more switching criteria, to switch roles of the first plurality of tablets and the second plurality of tablets;

responsive to said determining, switching roles of the first plurality of tablets and the second plurality of tablets, wherein after said switching, the first plurality of tablets is designated as analytic tablets and the second plurality of tablets is designated as active tablets;

merging, in accordance with physical block indices uniquely identifying physical blocks of storage, entries of the first plurality of tablets designated as analytic tablets, wherein said merging includes:

generating one of a plurality of tables of merged entries for each of the physical block indices wherein said one table includes merged entries of the first plurality of tablets associated with said each physical block index, wherein each of the physical blocks of storage includes content referenced by one or more virtual blocks of a plurality of virtual blocks;

updating, in accordance with the plurality of tables, a plurality of metric sets associated with the plurality of virtual blocks;

determining, using a first of the plurality of metric sets for a first of the plurality of virtual blocks referencing first content stored on a first of the physical blocks of storage, first one or more temperature classifications of the first virtual block at a current point in time; and determining, in accordance with said first one or more temperature classifications of the first virtual block at the current point in time, placement of the first content referenced by the first virtual block in one of a plurality of storage tiers.

* * * * *